United States Patent
Nabatame et al.

(10) Patent No.: US 10,304,184 B2
(45) Date of Patent: May 28, 2019

(54) NON-TRANSITORY COMPUTER READABLE RECORDING MEDIUM STORING PROGRAM FOR PATIENT MOVEMENT DETECTION, DETECTION METHOD, AND DETECTION APPARATUS

(71) Applicant: FUJITSU LIMITED, Kawasaki-shi, Kanagawa (JP)

(72) Inventors: Shinya Nabatame, Setagaya (JP); Kimitaka Murashita, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 50 days.

(21) Appl. No.: 15/269,186

(22) Filed: Sep. 19, 2016

(65) Prior Publication Data

US 2017/0091931 A1    Mar. 30, 2017

(30) Foreign Application Priority Data

Sep. 30, 2015  (JP) .................. 2015-195275

(51) Int. Cl.
*G06K 9/00* (2006.01)
*G06T 7/00* (2017.01)

(52) U.S. Cl.
CPC ........ *G06T 7/0012* (2013.01); *G06K 9/00335* (2013.01); *G06T 2207/10004* (2013.01); *G06T 2207/30201* (2013.01)

(58) Field of Classification Search
CPC ... G06T 7/0012; G06T 7/2006; G06T 7/0085; G06T 7/0081; G06T 2207/30201; G06T 2207/10004
USPC ................................................ 382/100, 103
See application file for complete search history.

(56) References Cited

U.S. PATENT DOCUMENTS

| 2006/0023918 | A1  | 2/2006  | Ertl et al. |            |
|--------------|-----|---------|-------------|------------|
| 2009/0174658 | A1* | 7/2009  | Blatchley   | G06F 1/1601 |
|              |     |         |             | 345/158    |
| 2009/0196507 | A1* | 8/2009  | Park        | G06K 9/00234 |
|              |     |         |             | 382/199    |
| 2012/0243731 | A1* | 9/2012  | Wang        | G06K 9/00771 |
|              |     |         |             | 382/103    |
| 2014/0210705 | A1* | 7/2014  | Kim         | G06F 3/0485 |
|              |     |         |             | 345/156    |
| 2014/0371599 | A1* | 12/2014 | Wu          | A61B 5/0077 |
|              |     |         |             | 600/476    |
| 2015/0010204 | A1* | 1/2015  | Iwai        | G06K 9/00771 |
|              |     |         |             | 382/103    |
| 2015/0213702 | A1* | 7/2015  | Kimmel      | G08B 21/043 |
|              |     |         |             | 382/103    |

FOREIGN PATENT DOCUMENTS

| JP | 2006-511826 | 4/2006 |
|----|-------------|--------|
| JP | 2015-11649  | 1/2015 |

\* cited by examiner

*Primary Examiner* — Andrew M Moyer
(74) *Attorney, Agent, or Firm* — Staas & Halsey LLP

(57) ABSTRACT

A non-transitory computer readable recording medium having therein a program for causing a computer to execute a process for patient movement detection, the process includes: acquiring an image; searching a candidate for a head image of a subject person in a target region defined in the image; and when, among a first region and a second region in the target region, no candidate for the head image is detected in the second region and one or more candidates for the head image are detected in the first region, detecting, as the head image of the subject person, the candidate for the head image detected farthermost from the second region.

7 Claims, 22 Drawing Sheets

US 10,304,184 B2

NON-TRANSITORY COMPUTER READABLE RECORDING MEDIUM STORING PROGRAM FOR PATIENT MOVEMENT DETECTION, DETECTION METHOD, AND DETECTION APPARATUS

CROSS-REFERENCE TO RELATED APPLICATION

This application is based upon and claims the benefit of priority of the prior Japanese Patent Application No. 2015-195275, filed on Sep. 30, 2015, the entire contents of which are incorporated herein by reference.

FIELD

The embodiments discussed herein are related to non-transitory computer readable recording medium having therein a program for causing a computer to execute a process for patient movement detection, a detection method, and a detection apparatus.

BACKGROUND

In medical facilities, nursing homes, and the like, a patient may leave his or her bed without a nurse or the like noticing that the patient has left, and an accident such as the patient wandering off and falling over may occur. To reduce the number of such accidents, there has been proposed a technology for detecting a movement of a patient regarding, for example, getting up from and leaving the bed.

For example, there is a technology for detecting the head of a person from images captured by a camera. With such a technology, for example, the head of a patient is detected from images captured by a camera installed at a position above a pillow on the bed, for example, directly above the headboard, and a getting-up movement or a bed leaving movement of the patient is recognized by tracking the detected head of the patient.

Japanese National Publication of International Patent Application No. 2006-511826 and Japanese Laid-open Patent Publication No. 2015-011649 are examples of related art.

SUMMARY

According to an aspect of the invention, a non-transitory computer readable recording medium having therein a program for causing a computer to execute a process for patient movement detection, the process includes: acquiring an image; searching a candidate for a head image of a subject person in a target region defined in the image; and when, among a first region and a second region in the target region, no candidate for the head image is detected in the second region and one or more candidates for the head image are detected in the first region, detecting, as the head image of the subject person, the candidate for the head image detected farthermost from the second region.

According to another aspect of the invention, a non-transitory computer readable recording medium having therein a program for causing a computer to execute a process for patient movement detection, the process includes: acquiring an image; searching a candidate for a head image of a subject person in a target region defined in the image; and when, among a first region and a second region in the target region, no candidate for the head image is detected in the first region and one or more candidates for the head image are detected in the second region, detecting, as the head image of the subject person, the candidate for the head image detected farthermost from the first region.

According to yet another aspect of the invention, a detection method includes: acquiring, by a computer, an image; searching a candidate for a head image of a subject person in a target region defined in the image; and when, among a first region and a second region in the target region, no candidate for the head image is detected in the second region and one or more candidates for the head image are detected in the first region, detecting, as the head image of the subject person, the candidate for the head image detected farthermost from the second region.

According to yet another aspect of the invention, a detection apparatus includes: a memory; and a processor coupled to the memory and the processor configured to, acquiring an image; searching a candidate for a head image of a subject person in a target region defined in the image; and when, among a first region and a second region in the target region, no candidate for the head image is detected in the second region and one or more candidates for the head image are detected in the first region, detecting, as the head image of the subject person, the candidate for the head image detected farthermost from the second region.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
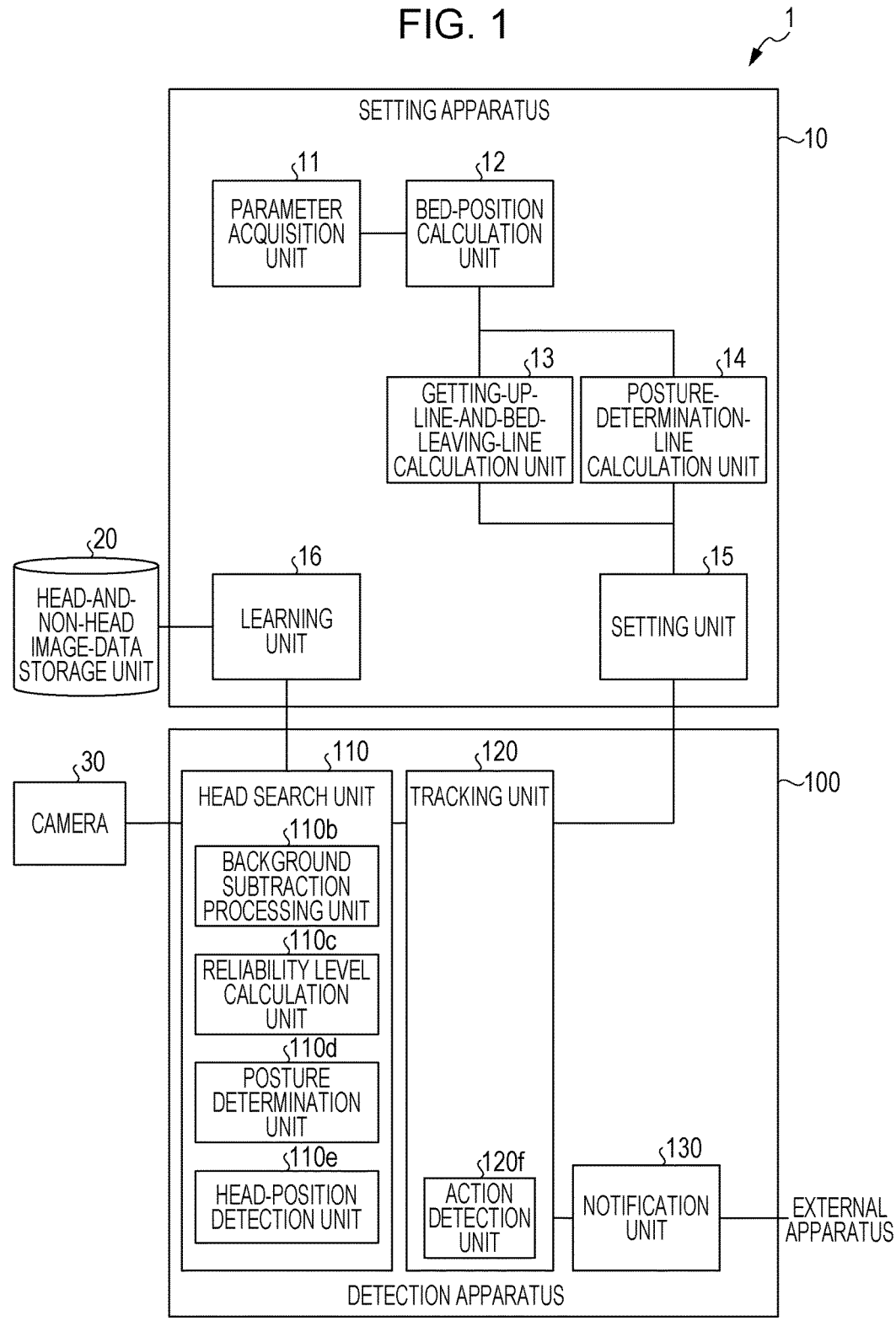
FIG. 1 is a block diagram illustrating an example of functional configurations of apparatuses included in a detection system according to a first embodiment.

However, with the technology described in the background, a portion other than the head of a patient or a still object such as bedding may be erroneously detected as the head of the patient.

According to one aspect, it is preferable to provide a non-transitory computer readable recording medium having therein a program, a detection method, and a detection apparatus that increase the accuracy of head detection.

In the following, a computer-readable recording medium storing program for a patient movement detection, a detection method for a patient movement detection, and a detection apparatus for a patient movement detection according to the present application will be described with reference to the attached drawings. Note that the following embodiments do not limit the technology disclosed herein. It is possible that the embodiments are combined as appropriate within the range where the content of processing does not contradict itself. In addition, in the embodiments, the same configurations and the same processes are denoted by the same reference numerals, and the description of the configurations and processes that have already been described will be omitted.

First Embodiment

Detection System According to First Embodiment

FIG. 1 is a block diagram illustrating an example of functional configurations of apparatuses included in a detection system according to a first embodiment. A detection system 1 illustrated in FIG. 1 is applied to medical facilities, nursing homes, and the like, and provides a detection service through which a movement of a user of a bed (a bed user), such as a patient or a person who receives nursing care, is detected using an image captured by a camera, the movement regarding an action of the user "getting up" from and "leaving bed" where the user or the patient has been "lying in bed".

Figure 2A:
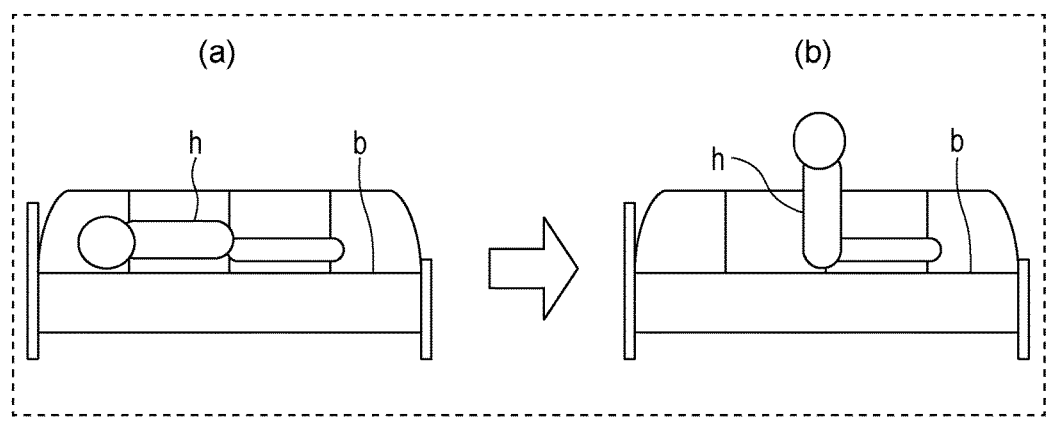
FIG. 2A is a diagram schematically illustrating an example of a getting-up movement in which a person gets up on a bed.
Figure 2B:
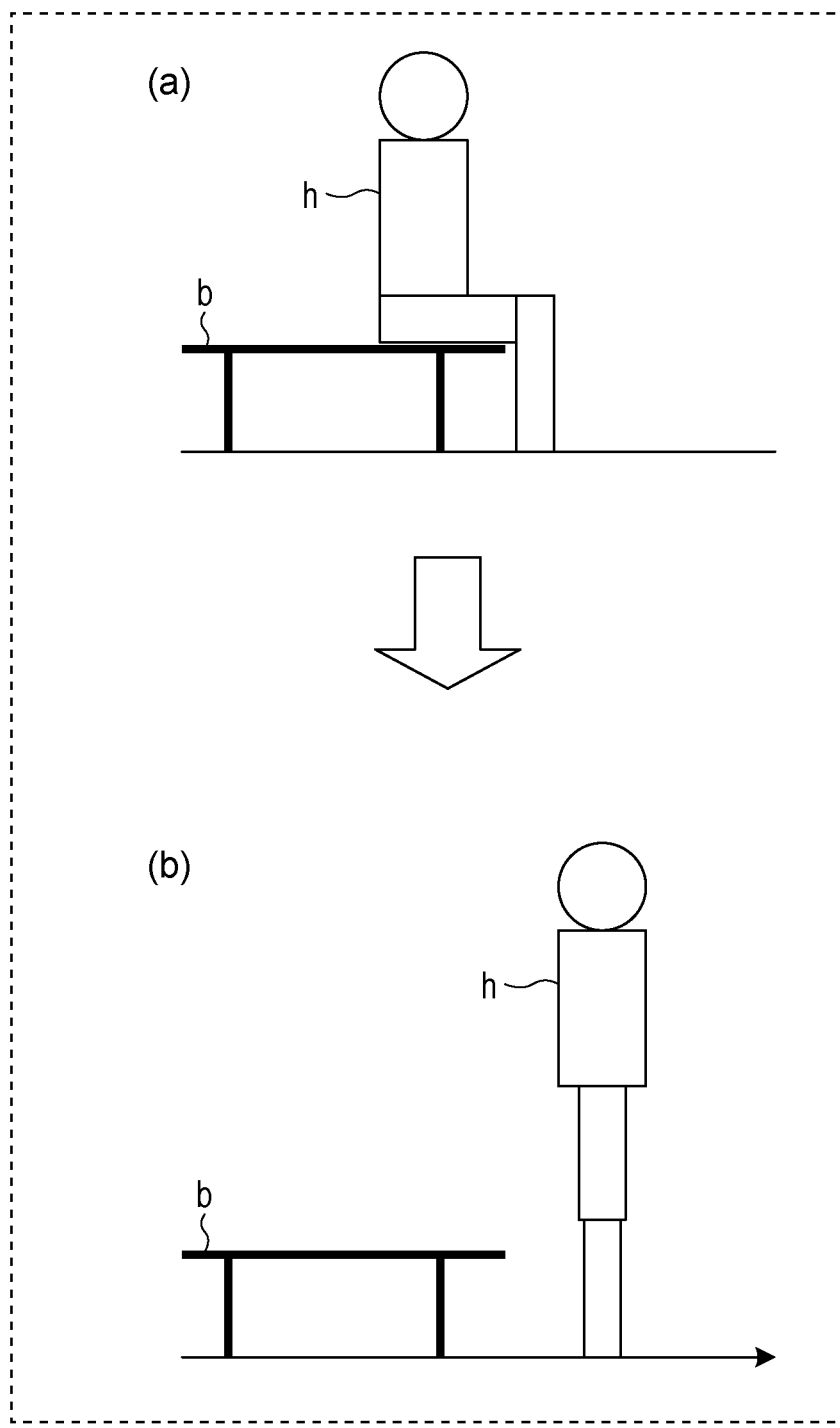
FIG. 2B is a diagram schematically illustrating an example of a bed leaving movement in which a person stands up from a bed.

First, "lying in bed", "getting up", and "leaving bed" will be described. FIG. 2A is a diagram schematically illustrating an example of a getting-up movement in which a person gets up on the bed. Moreover, FIG. 2B is a diagram schematically illustrating an example of a bed leaving movement in which a person stands up from the bed. "Lying in bed" indicates a state where, as illustrated in part (a) of FIG. 2A, a user or the patient h of a bed b is lying on a lying surface of the bed b. In addition, as illustrated in part (b) of FIG. 2A, "getting up" indicates a state where or a movement in which the user or the patient h of the bed b has lifted his or her upper body up from the state of "lying in bed" on the lying surface of the bed b and is sitting up on the bed b. In addition, "leaving bed" indicates a state where or a movement in which the user or the patient h of the bed b enters, from the state of "getting up" illustrated in part (b) of FIG. 2A on the lying surface of the bed b, a state where the user or the patient h is sitting on the lying surface of the bed b as illustrated in part (a) of FIG. 2B, and thereafter the user or the patient h of the bed b stands up as illustrated in part (b) of FIG. 2B and leaves the bed b.

As part of such a detection service, the detection system 1 detects candidates for the head image of a user of a bed detected from an image captured by a camera, the user being in a lying-in-bed or getting-up state. The detection system 1 determines whether the user of the bed is in a lying-in-bed posture or a getting-up posture from a determination of a head-image-candidate distribution status based on a posture determination line set for the bed. The detection system 1 detects the head image of the user of the bed among the candidates for the head image of the user of the bed in accordance with the determined posture of the user of the bed.

Furthermore, the detection system 1 tracks the detected head of the user of the bed. When the path of the tracked head of the user of the bed crosses a getting-up line set for the bed, the detection system 1 detects the action of the user of the bed from lying in bed to getting up. When the path of the tracked head of the user of the bed crosses a bed leaving line set for the bed, the detection system 1 detects the action of the user of the bed from getting up to leaving bed. Note that "cross" indicates that when the image of an immediately preceding frame is compared with the image of the current frame, the path of the tracked head of the user of the bed has not crossed the getting-up line or the bed leaving line in the image of the immediately preceding frame, and has crossed the getting-up line or the bed leaving line in the image of the current frame.

As illustrated in FIG. 1, the detection system 1 includes a setting apparatus 10, a head-and-non-head image-data storage unit 20, a camera 30, and a detection apparatus 100. The setting apparatus 10, the head-and-non-head image-data storage unit 20, the camera 30, and the detection apparatus 100 are connected to each other so that communication is possible via a certain network. As such a network, for example, a communication network of any type may be employed such as a wired network or a wireless network, a public network or a closed network, a circuit switched network or a store-and-forward switching network, or the like.

Note that FIG. 1 illustrates, as an example, one camera 30; however, the detection system 1 may include a plurality of cameras 30. Here, as the camera 30, an image pickup apparatus including an image pickup device, such as a charge coupled device (CCD) or a complementary metal oxide semiconductor (CMOS), may be employed. Alternatively, an infrared camera or a visible light camera may be employed as the camera 30. As an embodiment, the camera 30 is installed at a position from which the entirety or part of a bed provided for a patient in a medical facility or a nursing home is included in an image pickup range. For example, the camera 30 may be oriented in the direction from a position at the bed near a pillow (a pillow position) toward a position of feet of the user lying on the bed (a foot position), and installed at a certain position from which images of the lying surface of the bed may be captured. Note that, in the following, the case where the camera 30 is oriented in the direction from the pillow position toward the feet position and installed will be described as an example; however, the camera 30 may also be oriented in the direction from the feet position toward the pillow position.

[Getting-Up Line, Bed Leaving Line, and Posture Determination Line]

A getting-up line, a bed leaving line, and a posture determination line are data in an image coordinate system set on an image captured by the camera 30, and are obtained by projecting, onto a two-dimensional image coordinate system, coordinates defined in a three-dimensional space of an environment in which the camera 30 is installed. As such a three-dimensional coordinate system, for example, a bed coordinate system is defined.

Figure 3A:
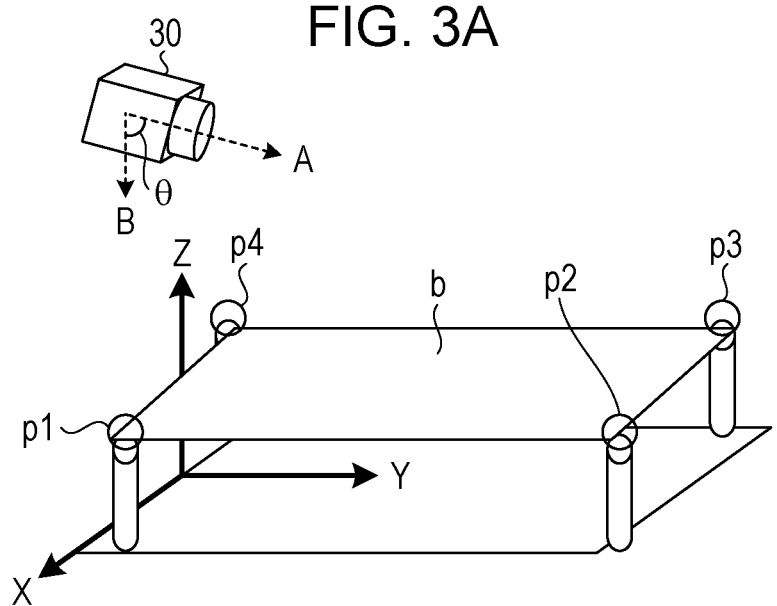
FIG. 3A is a diagram illustrating an example of definitions of a camera position, a camera angle, and four corners of a bed in a bed coordinate system.
Figure 3B:
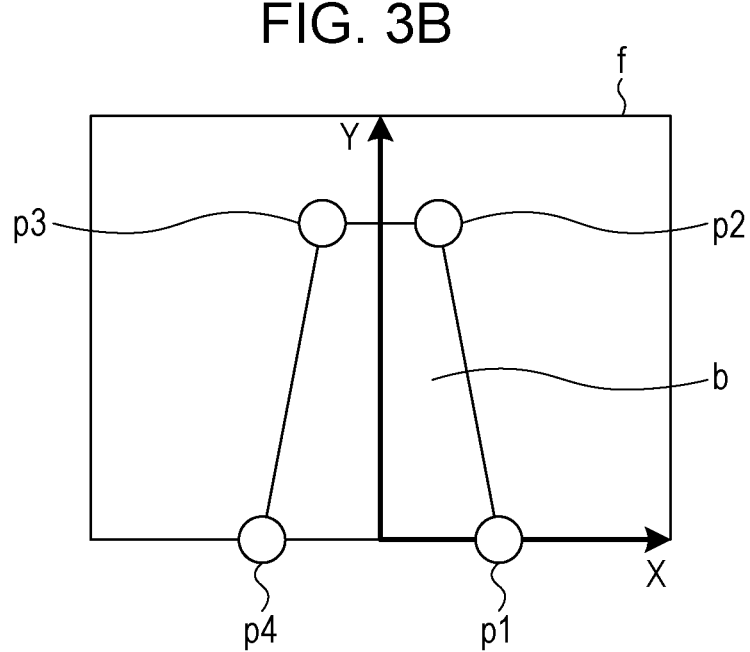
FIG. 3B is a diagram illustrating an example of definitions of the four corners of the bed in the bed coordinate system.

FIG. 3A is a diagram illustrating an example of definitions of a camera position, a camera angle, and four corners of a bed in a bed coordinate system. In addition, FIG. 3B is a diagram illustrating an example of definitions of the four corners of the bed in the bed coordinate system. As illustrated in FIG. 3A, the bed coordinate system has an origin point, for example, at or near a point directly below the center of the short side at the side of the pillow position within the lying surface of the bed b, and is a three-dimensional rectangular coordinate system in which the lateral direction of the bed b is the X axis, the longitudinal direction of the bed b is the Y axis, and the height direction of the bed b is the Z axis.

As illustrated in FIG. 3A, the depression angle of the camera 30 is an angle that a shooting direction A of the camera 30 forms with the negative Z-axis direction B. As illustrated in FIG. 3A, in the bed coordinate system, the camera 30 is oriented in the direction from the pillow position of the bed b toward the foot position and installed at a certain position from which images of the lying surface of the bed b may be captured. The depression angle indicating the shooting direction in which the camera 30 captures an image of the lying surface of the bed b is, for example, θ [deg] with respect to the negative Z-axis direction.

The detection system 1 acquires, from the outside, the coordinates of the position of the bed b, the coordinates of four corners p1 to p4 of the lying surface of the bed b, and the depression angle for the camera 30 in the bed coordinate system. As illustrated in FIG. 3B, the detection system 1 then calculates the positions of the four corners p1 to p4 of the bed b in a frame f. Note that the frame f is a frame of an image of the bed b captured by the camera 30.

Figure 4:
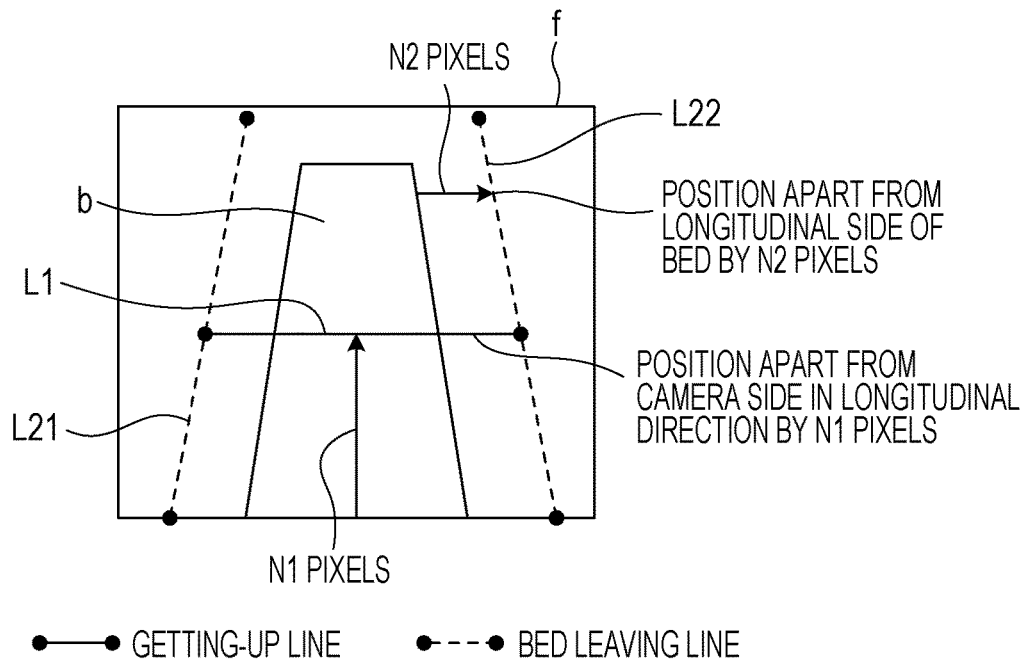
FIG. 4 is a diagram illustrating an example of a getting-up line and a bed leaving line.

FIG. 4 is a diagram illustrating an example of a getting-up line and a bed leaving line. FIG. 4 illustrates an example in which a getting-up line L1 is set, for example, across the bed b laterally at a position apart from the pillow side of the lying surface of the bed b in the longitudinal direction by N1 pixels. Furthermore, FIG. 4 illustrates an example in which bed leaving lines L21 and L22 are set parallel to the left and right side edges of the bed b, and at positions apart from the left and right side edges by N2 pixels.

For example, when a central region of a candidate for the head image of a user or a patient tracked by the detection system 1 exists on the side of an image above the getting-up line L1, in other words, when the Y coordinate of the central region of the candidate for the head image of the patient is greater than the Y coordinate of the getting-up line L1, it is determined that the user or the patient has got up. In addition, for example, when a central region of a candidate for the head image of a patient tracked by the detection system 1 is on the left side with respect to the bed leaving line L21, in other words, when the X coordinate of the central region of the candidate for the head image of the patient is smaller than the X coordinate of the bed leaving line L21, it is determined that the user or the patient has left the bed. In addition, for example, when a central region of a candidate for the head image of a user or a patient tracked by the detection system 1 is on the right side with respect to the bed leaving line L22, in other words, when the X coordinate of the central region of the candidate for the head image of the user or the patient is greater than the X coordinate of the bed leaving line L22, it is also determined that the user or the patient has left the bed.

Figure 5:
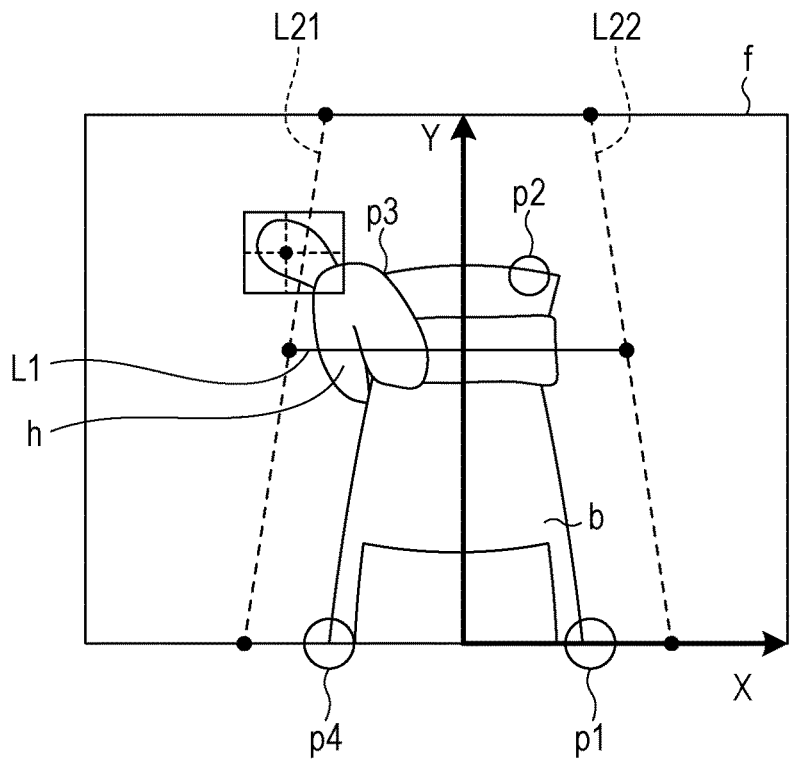
FIG. 5 is a diagram illustrating an example of a relationship between a getting-up movement and a getting-up line and a relationship between a bed leaving movement and a bed leaving line.

FIG. 5 is a diagram illustrating an example of a relationship between a getting-up movement and a getting-up line and a relationship between a bed leaving movement and a bed leaving line. For example, as illustrated in FIG. 5, the Y coordinate of a central region of a candidate for the head image of the user or the patient h of the bed b is greater than the Y coordinate of the getting-up line L1. Thus, the detection system 1 determines that the user or the patient h of the bed b has got up. Furthermore, the X coordinate of the central region of the candidate for the head image of the user or the patient h of the bed b is smaller than the X coordinate of the getting-up line L21. Thus, the detection system 1 determines that the user or the patient h of the bed b has left the bed.

Figure 6A:
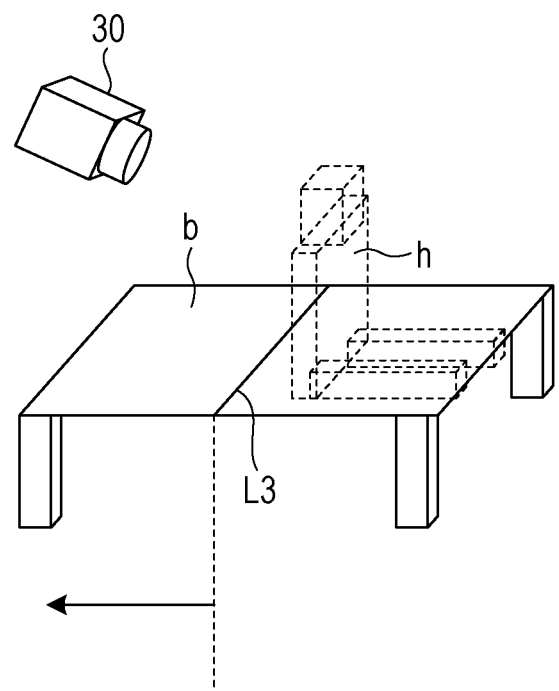
FIGS. 6A and 6B are diagrams illustrating an example of a posture determination line.
Figure 6B:
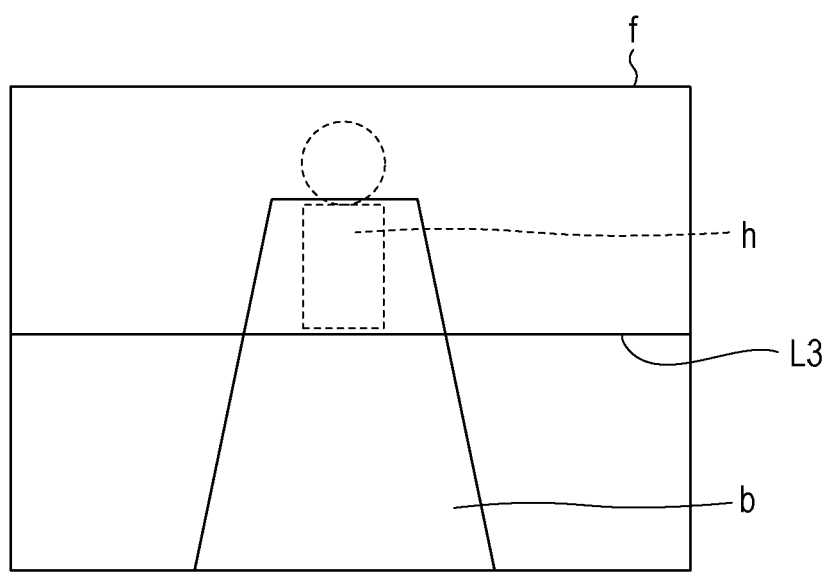

FIGS. 6A and 6B are diagrams illustrating an example of a posture determination line. As illustrated in FIG. 6A, a posture determination line L3 is a line set in the lateral direction of the lying surface of the bed b, and defined as a boundary with respect to which the user or the patient h does not sit on the side of the lying surface of the bed b where the pillow is placed, when the user or the patient h of the bed b gets up on the lying surface of the bed b. The posture determination line L3 is calculated from, for example, certain parameters including the length of the bed b in the longitudinal direction, the installation position and the depression angle of the camera 30 in the bed coordinate system, and the height and the sitting height of the user or the patient h of the bed b. The projection position of the posture determination line L3 in a frame f is determined as illustrated in FIG. 6B. Note that the posture determination line L3 may also be a certain fixed value.

FIG. 6B illustrates a case where an image captured by the camera 30 in FIG. 6A is projected onto a frame f. For example, when all candidates for the head image of the user or the patient h of the bed b exist in the frame f on the side of the image above the posture determination line L3, the detection system 1 determines that the posture of the user or the patient is in the getting-up state. That is, when the Y coordinates of central regions of all the candidates for the head image of the user or the patient h of the bed b are greater than the Y coordinate of the getting-up line L1, the detection system 1 determines that the posture of the patient is in the getting-up state. For example, when all candidates for the head image of the user or the patient h of the bed b exist in the frame f on the side of the image below the posture determination line L3, that is, when the Y coordinates of central regions of all the candidates for the head image of the user or the patient h of the bed b are smaller than the Y coordinate of the getting-up line L1, the detection system 1 determines that the posture of the patient is in the lying-in-bed state.

Figure 7A:
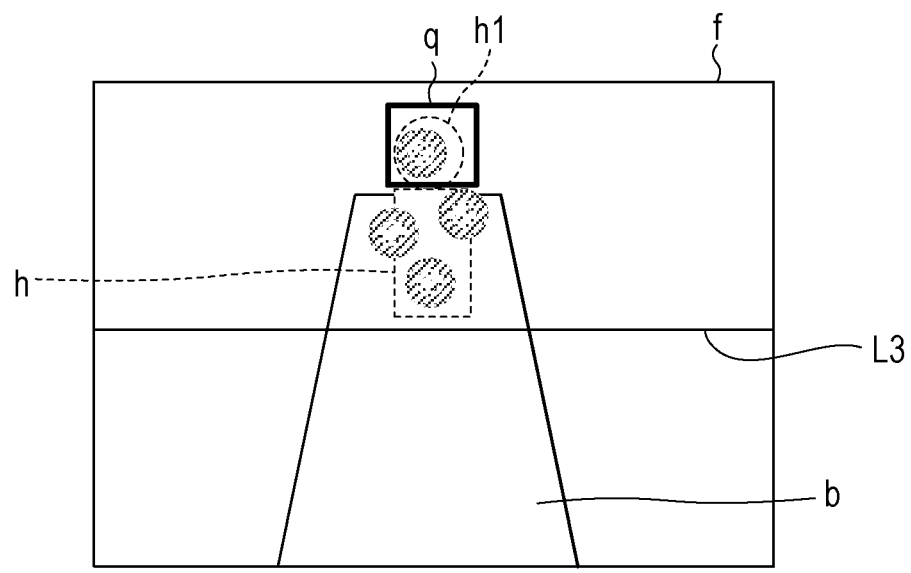
FIGS. 7A and 7B are diagrams schematically illustrating an example of an overview of a posture determination and head position detection according to the first embodiment.
Figure 7B:
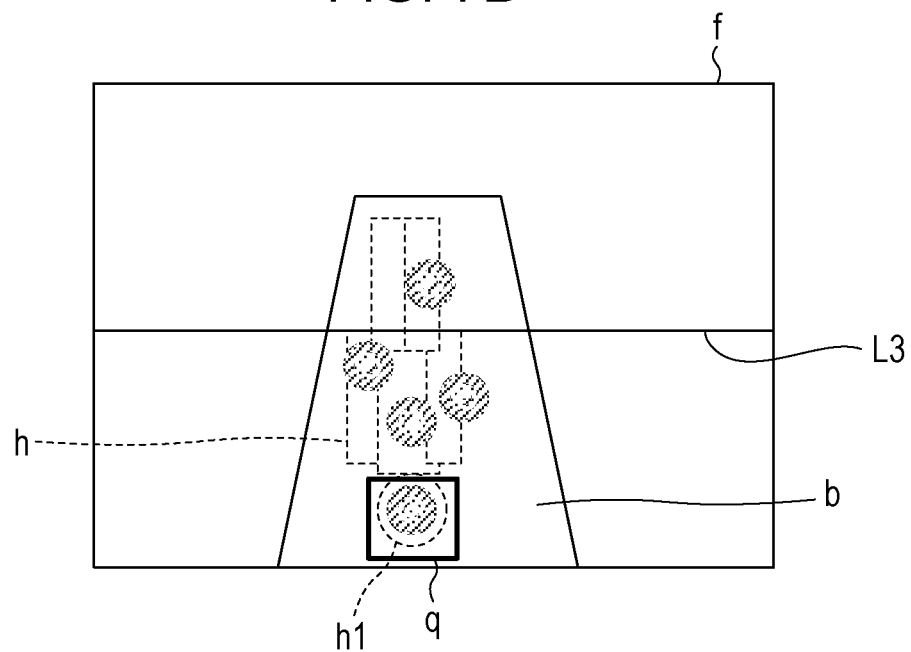

FIGS. 7A and 7B are diagrams schematically illustrating an example of an overview of a posture determination and head position detection according to the first embodiment. FIG. 7A illustrates an example in which because all candidates for the head image of the user or the patient h of the bed b exist in a frame f on the side of the image above the posture determination line L3 (for example, a first region), it is determined that the posture of the patient is in the getting-up state. The region on the side of the image above the posture determination line L3 is appropriately referred as to the first region. When all candidates for the head image of the user or the patient h of the bed b exist in a frame f on the side of the image above the posture determination line L3, the detection system 1 determines that the posture of the user or the patient is in the getting-up state. The detection system 1 then determines a detection range q including the candidate positioned highest in the frame f for the head image of the user or the patient h among the candidates for the head image of the user or the patient h. The detection range q is a range for detecting the head image h1 of the user or the patient h in the following frames.

In addition, FIG. 7B illustrates an example in which because all candidates for the head image of the user or the patient h of the bed b do not exist in a frame f on the side of the image above the posture determination line L3, it is determined that the posture of the patient is in the lying-in-bed state. In a frame f, when all candidates for the head image of the user or the patient h of the bed b do not exist only on the side of the image above the posture determination line L3 but exist only on the side of the image below the posture determination line L3 (for example, a second region), the detection system 1 determines that the posture of the patient is in the lying-in-bed state. The side of the image below the posture determination line L3 is appropriately referred as to a second region. In a frame f, when candidates for the head image of the user or the patient h exist on both of the top and bottom sides, for example on the first region and the second region, of the image with respect to the posture determination line L3 serving as a boundary, the detection system 1 determines that the posture of the patient is in the lying-in-bed state. The detection system 1 then determines a detection range q including the candidate positioned lowest in the frame f for the head image of the user or the patient h among the candidates for the head image of the user or the patient h.

Setting Apparatus According to First Embodiment

The setting apparatus 10 is an apparatus that sets various settings in the detection apparatus 100. As an embodiment, the setting apparatus 10 may be implemented as an information processing apparatus used by persons associated with the facility. For example, as the setting apparatus 10, a desktop personal computer, a notebook personal computer, or a tablet personal computer may be employed. In addition to these personal computers, as the setting apparatus 10, a mobile communication terminal, such as a smartphone, a mobile phone, or a Personal Handyphone System (PHS), or furthermore a slate device, such as a personal digital assistant (PDA), may also be employed. Furthermore, the setting apparatus 10 may also be implemented as a console of the detection apparatus 100.

The setting apparatus 10 includes a parameter acquisition unit 11, a bed-position calculation unit 12, a getting-up-line-and-bed-leaving-line calculation unit 13, a posture-determination-line calculation unit 14, a setting unit 15, and a learning unit 16.

The parameter acquisition unit 11 acquires certain parameters including the length of the bed b in the longitudinal direction, the installation position and the depression angle θ of the camera 30 in the bed coordinate system, and the height and the sitting height of the user or the patient h of the bed b. As an embodiment, the parameter acquisition unit 11 may acquire certain parameters through input operations performed via an input device, which is not illustrated. In addition to this, the parameter acquisition unit 11 may also acquire certain parameters from an auxiliary storage apparatus, such as a hard disk or an optical disc, or a removable medium, such as a memory card or a Universal Serial Bus (USB) memory. Furthermore, the parameter acquisition unit 11 may also acquire certain parameters by receiving the parameters from an external apparatus via a network.

The bed-position calculation unit 12 calculates, using the certain parameters acquired by the parameter acquisition unit 11, the coordinates of the four corners p1 to p4 of the lying surface of the bed b in the bed coordinate system. The bed-position calculation unit 12 then calculates the positions of the four corners p1 to p4 of the bed b in a frame f.

The getting-up-line-and-bed-leaving-line calculation unit 13 calculates, from the positions of the four corners p1 to p4 of the bed b calculated by the bed-position calculation unit 12 in the frame f, a getting-up line L1 and bed leaving lines L21 and L22.

The posture-determination-line calculation unit 14 calculates, from the positions of the four corners p1 to p4 of the bed b calculated by the bed-position calculation unit 12 in the frame f and the certain parameters acquired by the parameter acquisition unit 11, a posture determination line L3 in the frame f.

The setting unit 15 sets, in the detection apparatus 100, the getting-up line L1 and the bed leaving lines L21 and L22 calculated by the getting-up-line-and-bed-leaving-line calculation unit 13 and the posture determination line L3 calculated by the posture-determination-line calculation unit 14.

The learning unit 16 is a processing unit that performs machine learning on an image of the head of the user or the patient h of the bed b, based on images of the heads of persons and images of non-head portions stored in the head-and-non-head image-data storage unit 20. The images of the heads of the persons may also include an image of the head of the user or the patient h of the bed b. In addition, the images of the non-head portions are images of objects other than the head of the user or the patient h present on the lying surface of the bed b, such as images of futons and images of non-head body parts. Images of the heads of the persons and images of the non-head portions may also be accumulated as appropriate. As an embodiment, the learning unit 16 performs machine learning using training data based on HOG feature values+Real AdaBoost.

Figure 8:
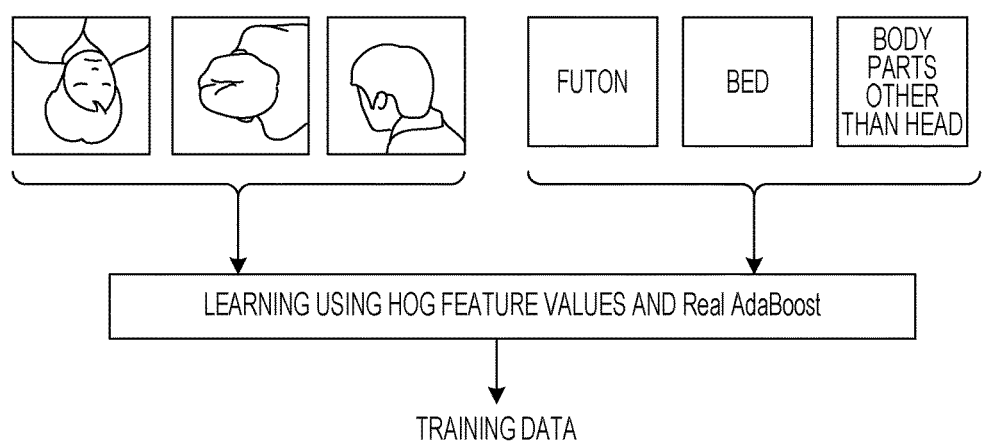
FIG. 8 is a diagram illustrating an example of a learning method.

FIG. 8 is a diagram illustrating an example of a learning method. As illustrated in FIG. 8, the learning unit 16 uses, as training samples, positive data regarding the heads of persons and negative data regarding Japanese-style bedding, beds, non-head body parts, and the like. The learning unit 16 then generates, as a head-detection detector (a Real-Ada Boost detector on the basis of HOG feature values) (refer to this detector as HOG detector), an HOG-feature-values-and-Real-AdaBoost classifier by learning HOG feature values of the training samples in accordance with a Real AdaBoost algorithm. The HOG-feature-value-and-Real-AdaBoost discriminator generated in this manner for head detection is set as a determination model used by a head search unit 110 of the detection apparatus 100. The HOG-feature-value-and-Real-AdaBoost discriminator detects a target shape by outputting, through edge detection processing performed on an image captured by the camera 30, a reliability level in accordance with the degree of similarity between a local shape (for example, the shape of the head) of a studied person and a portion having a shape similar to the local shape.

Note that processing units such as the parameter acquisition unit 11, the bed-position calculation unit 12, the getting-up-line-and-bed-leaving-line calculation unit 13, the posture-determination-line calculation unit 14, the setting unit 15, and the learning unit 16 may be implemented as in the following. For example, the processing units may be realized by a central processing unit (CPU) or the like loading, into a memory, processes that deliver the same functions as the processing units and executing the processes. These functional units may be executed by a microprocessing unit (MPU) instead of execution by the CPU. In addition, the functional units may also be realized by hard wired logic, such as an application specific integrated circuit (ASIC) or a field-programmable gate array (FPGA).

In addition, as an example, various types of semiconductor memory element, for example, a random-access memory (RAM) or a flash memory may be employed as a main memory used by the processing units. In addition, a storage apparatus to which the processing units refer may also be an auxiliary storage apparatus instead of the main memory on every occasion. In this case, a hard disk drive (HDD), an optical disc, a solid state drive (SSD), or the like may be employed.

Detection Apparatus According to First Embodiment

Next, the detection apparatus 100 according to the first embodiment will be described. As an embodiment, the detection apparatus 100 may be implemented by installing, in a certain computer, a program that realizes a detection process as packaged software or online software. For example, the detection apparatus 100 may be implemented as a Web server that provides a service based on the detection process, or may also be implemented as cloud computing that provides a service based on the detection process through outsourcing. In addition to these, a portable terminal device may be caused to serve as the detection apparatus 100 by installing a detection process program in the portable terminal device, such as a mobile communication terminal, examples of which are a smartphone, a portable phone, and a Personal Handyphone System (PHS), or a tablet terminal.

As illustrated in FIG. 1, the detection apparatus 100 includes the head search unit 110, a tracking unit 120, and a notification unit 130. As an embodiment, the head search unit 110 starts up a process every time the camera 30 captures an image. The head search unit 110 detects a head position every time a frame of an image is input. The tracking unit 120 tracks the detected head position on a frame-by-frame basis, based on the head position detected by the head search unit 110, and detects the action of the user or the patient h of the bed b.

The head search unit 110 is a processing unit that detects a head from an image. The head search unit 110 includes a background subtraction processing unit 110b, a reliability level calculation unit 110c, a posture determination unit 110d, and a head-position detection unit 110e.

Figure 9:
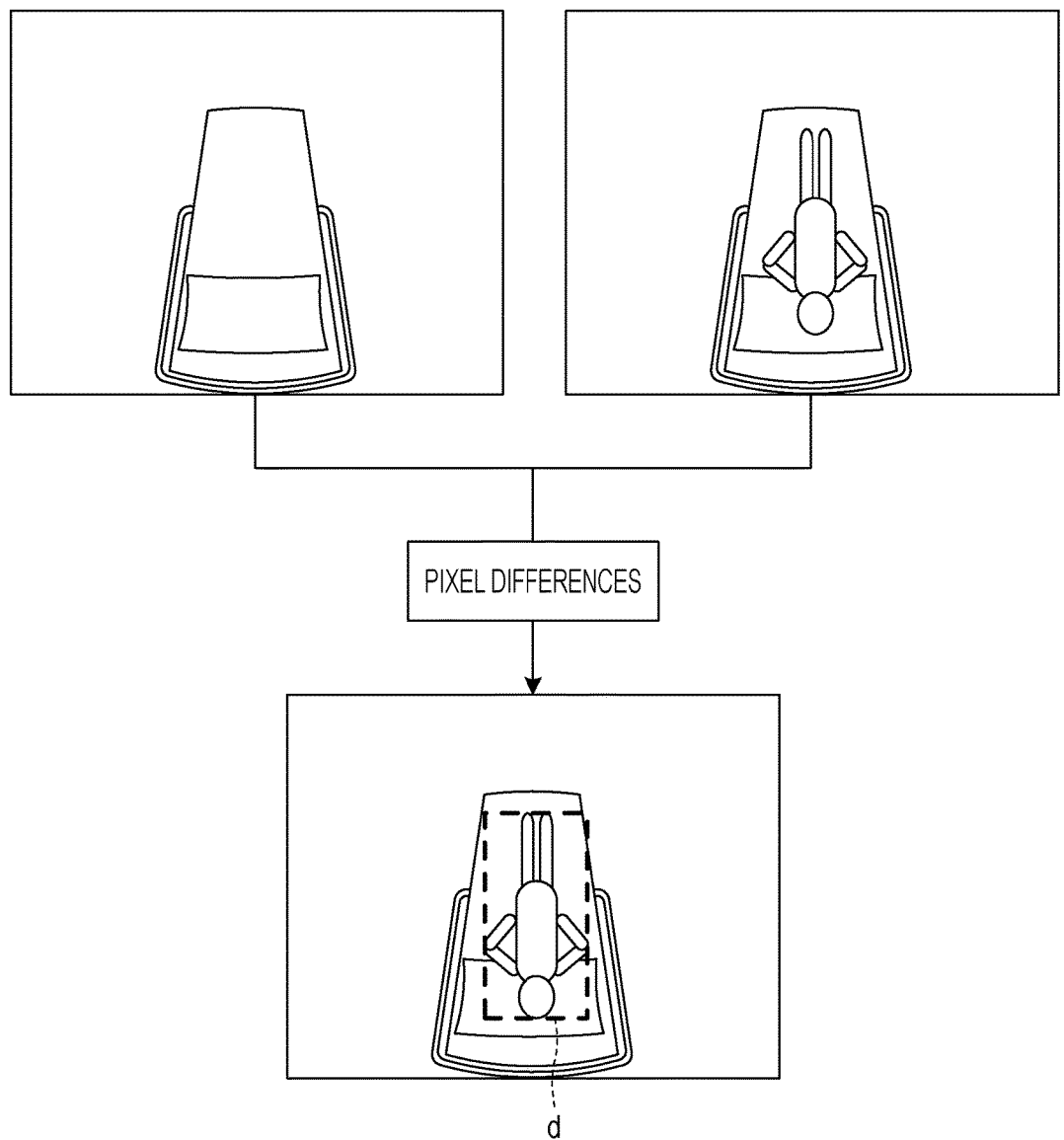
FIG. 9 is a diagram schematically illustrating an example of an overview of background difference detection.

FIG. 9 is a diagram schematically illustrating an example of an overview of background difference detection. The background subtraction processing unit 110b detects, as illustrated in FIG. 9, a difference region d from the pixel differences between a background image and each frame or the pixel differences between frames that are next to each other.

Figure 10:
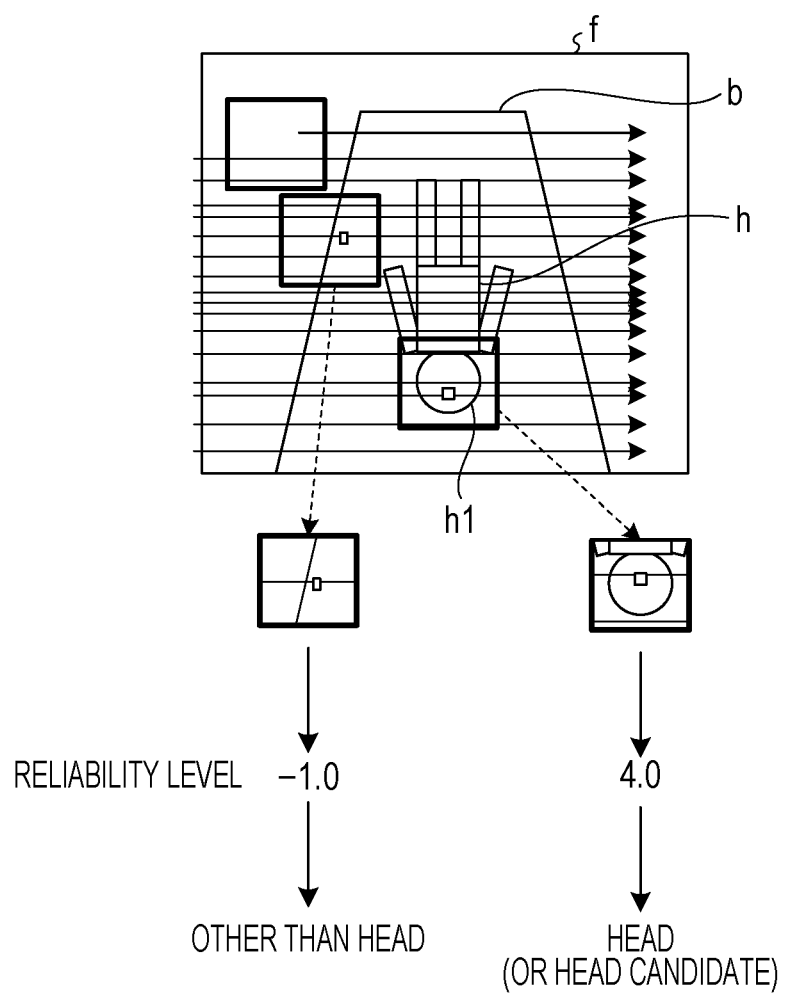
FIG. 10 is a diagram illustrating an example of a scanning method.

FIG. 10 is a diagram illustrating an example of a scanning method. As illustrated in FIG. 10, the reliability level calculation unit 110c detects the position of a head, for example, the position of the barycenter of the head by performing raster scanning on an image for which a difference region d is detected by the background subtraction processing unit 110b, and using the HOG-feature-value-and-Real-AdaBoost discriminator generated by the learning unit 16.

For each of pixels of the image on which raster scanning has been performed, the reliability level calculation unit 110c acquires, using the HOG-feature-value-and-Real-Ada Boost discriminator generated by the learning unit 16, a reliability level of each pixel with respect to, for example, the positive data regarding the head image of person, and extracts a region whose reliability level is positive (reliable region). The reliability level is a value indicating the likelihood of the head image of a person. For example, −5 indicates the lowest likelihood, +5 indicates the highest likelihood, and the reliability level is a value from −5 to +5 in increments of one. Note that the value range of the reliability level and the size of an increment may be changed as appropriate. In the example illustrated in FIG. 10, the head image h1 of the user or the patient h of the bed b has a reliability level of 4.0, and a circumference portion of the bed b has a reliability level of −1.0 in a frame f. Thus, the reliability level calculation unit 110c extracts a region with a positive reliability level as the head image of the user or the patient h of the bed b or a candidate for the head image of the user or the patient h of the bed b, and does not extract a region with a reliability level that is not positive.

Figure 11A:
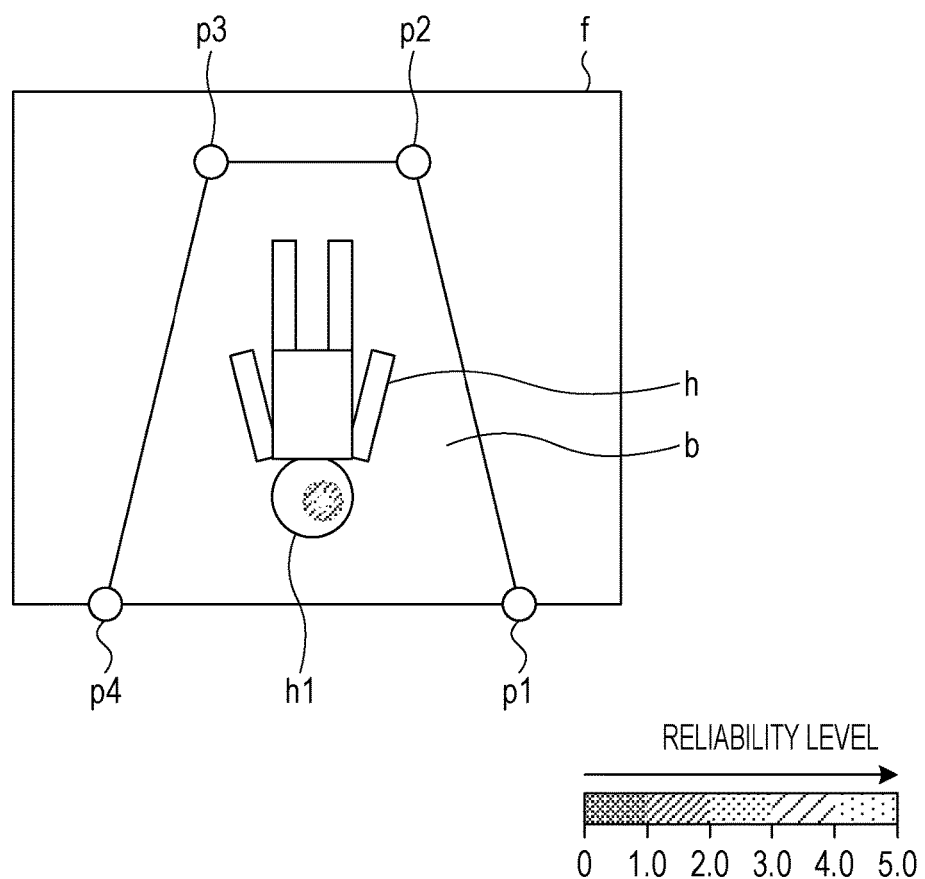
FIG. 11A is a diagram illustrating an example of reliability level output.
Figure 11B:
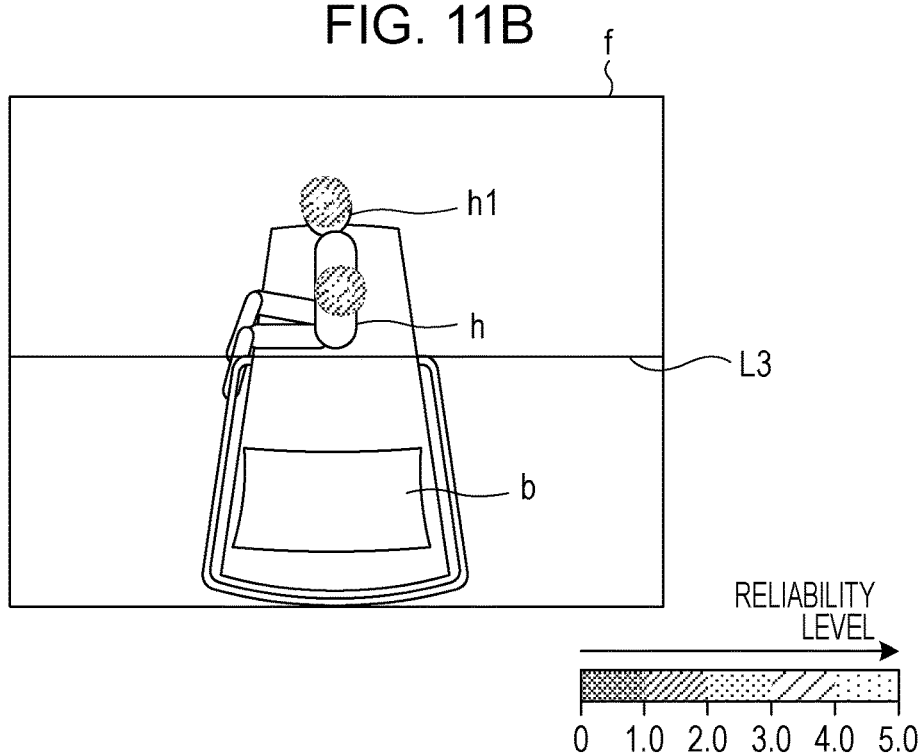
FIG. 11B is a diagram illustrating an example of reliability level output.
Figure 11C:
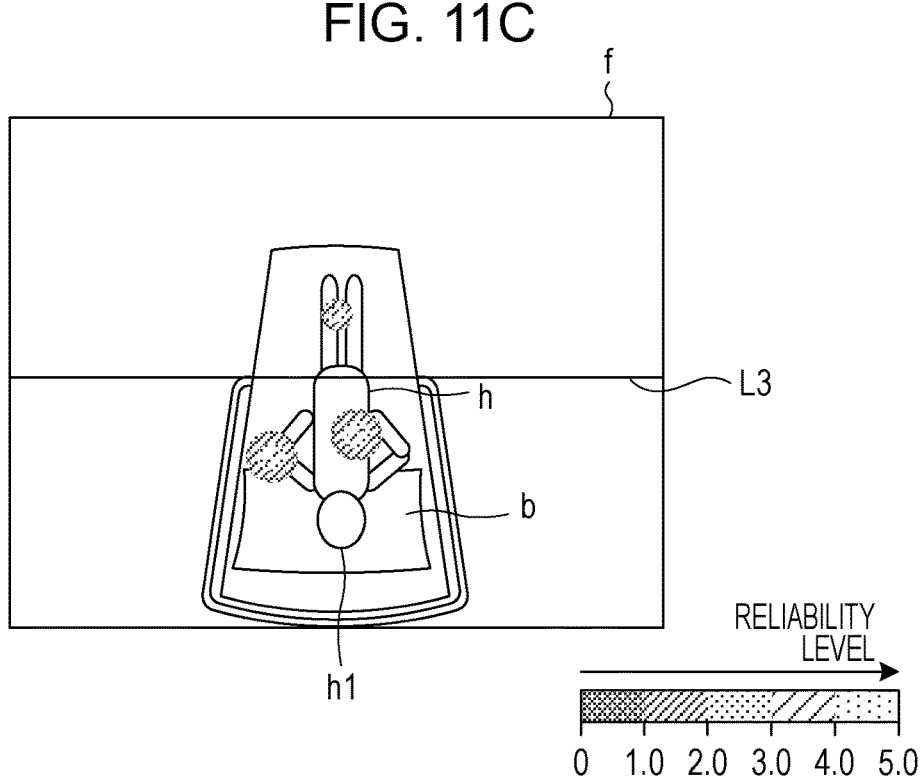
FIG. 11C is a diagram illustrating an example of reliability level output.

FIGS. 11A to 11C are diagrams illustrating examples of reliability level output. As illustrated in FIG. 11A, in the case where the reliability level calculation unit 110c extracts only the head image h1 of the user or the patient h of the bed b as a region with a positive reliability level, that is, a candidate for the head image of the user or the patient h of the bed b, the head image h1 of the user or the patient h of the bed b is uniquely determined.

However, as illustrated in FIGS. 11B and 11C, there may actually be a case where the reliability level calculation unit 110c extracts a plurality of candidate regions for the head image h1 of the user or the patient h of the bed b, and thus the head image h1 of the user or the patient h of the bed b is not uniquely determined. Thus, in the case where getting up or bed leaving of the user or the patient h is determined by tracking the head image h1 of the user or the patient h of the bed b, a getting-up or bed-leaving determination result varies depending on which candidate region is to be used for the head image h1 of the user or the patient h of the bed b, and the reliability level of the determination result may be lowered.

Accordingly, when all candidate regions for the head image h1 of the user or the patient h of the bed b extracted as regions with positive reliability levels in the frame f by the reliability level calculation unit 110c are positioned above the posture determination line L3 as illustrated in FIG. 11B, the posture determination unit 110d determines that the posture of the user or the patient h of the bed b is in the getting-up state. The head-position detection unit 110e then detects, as the head position, the candidate region positioned highest among all the candidate regions for the head image h1 of the user or the patient h, who is determined to be in the getting-up state by the posture determination unit 110d, of the bed b.

In addition, as illustrated in FIG. 11C, in cases other than the case where all the candidate regions for the head image h1 of the user or the patient h of the bed b extracted as regions with positive reliability levels in the frame f by the reliability level calculation unit 110c are positioned above the posture determination line L3, the posture determination unit 110d determines that the posture of the user or the patient h of the bed b is in the lying-in-bed state. The head-position detection unit 110e then detects or estimates, as the head position, the candidate region positioned lowest among all the candidate regions for the head image h1 of the user or the patient h, who is determined to be in the lying-in-bed state by the posture determination unit 110d, of the bed b.

Note that in a region with a positive reliability level, that is, a head region or a head candidate region, as illustrated in FIGS. 11A to 11C, an area with the highest reliability level is positioned at the center of the region, and the reliability level becomes lower in a substantially concentric manner toward the circumference about the center. The center at which the area with the highest reliability level is positioned is called as the barycenter of the head region or head candidate region.

The tracking unit 120 includes an action detection unit 120f. The action detection unit 120f determines whether or not the head position detected by the head-position detection unit 110e of the head search unit 110 has crossed the getting-up line or any of the bed leaving lines. In the case where the head position has crossed the getting-up line, the action detection unit 120f determines that the user or the patient h of the bed b is in the getting-up state. In the case where the head position has crossed any of the bed leaving lines, the action detection unit 120f determines that the user or the patient h of the bed b is in a bed leaving state. When the action detection unit 120f determines that the user or the patient h of the bed b is in, for example, the bed leaving state, the action detection unit 120f commands the notification unit 130 to issue a notification such as a nurse call.

In contrast, when the action detection unit 120f does not determine that the user or the patient h of the bed b is, for example, in the bed leaving state, the action detection unit 120f causes the head search unit 110 to perform the processes on the next frame.

Initial Setting Process According to First Embodiment

Figure 12:
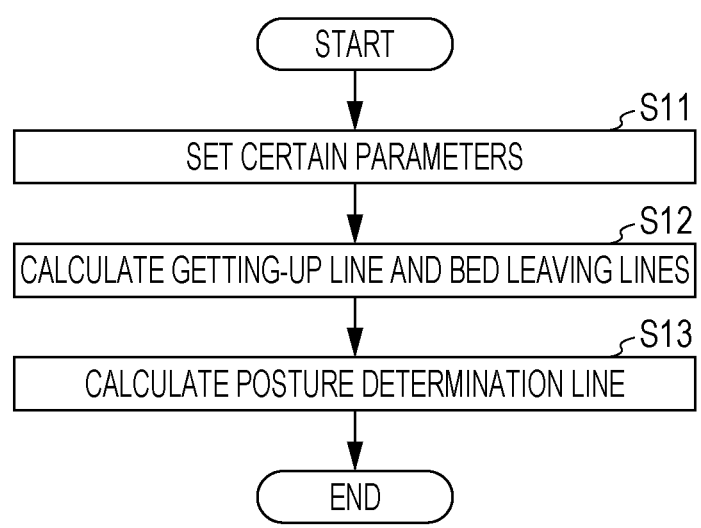
FIG. 12 is a flowchart illustrating an example of the procedure of an initial setting process according to the first embodiment.

FIG. 12 is a flowchart illustrating an example of the procedure of an initial setting process according to the first embodiment. The initial setting process according to the first embodiment is executed by the setting apparatus 10 every time a certain parameter is acquired, at certain intervals, or at any timings.

First, the parameter acquisition unit 11 acquires certain parameters and sets the certain parameters in the setting apparatus 10 (step S11). Next, the getting-up-line-and-bed-leaving-line calculation unit 13 calculates a getting-up line L1 and bed leaving lines L21 and L22, based on the positions of the four corners p1 to p4 of the bed b calculated by the bed-position calculation unit 12 and the like (step S12). Next, the posture-determination-line calculation unit 14 calculates a posture determination line L3, based on the positions of the four corners p1 to p4 of the bed b calculated by the bed-position calculation unit 12 and the certain parameters acquired by the parameter acquisition unit 11 (step S13).

Search Process According to First Embodiment

Figure 13A:
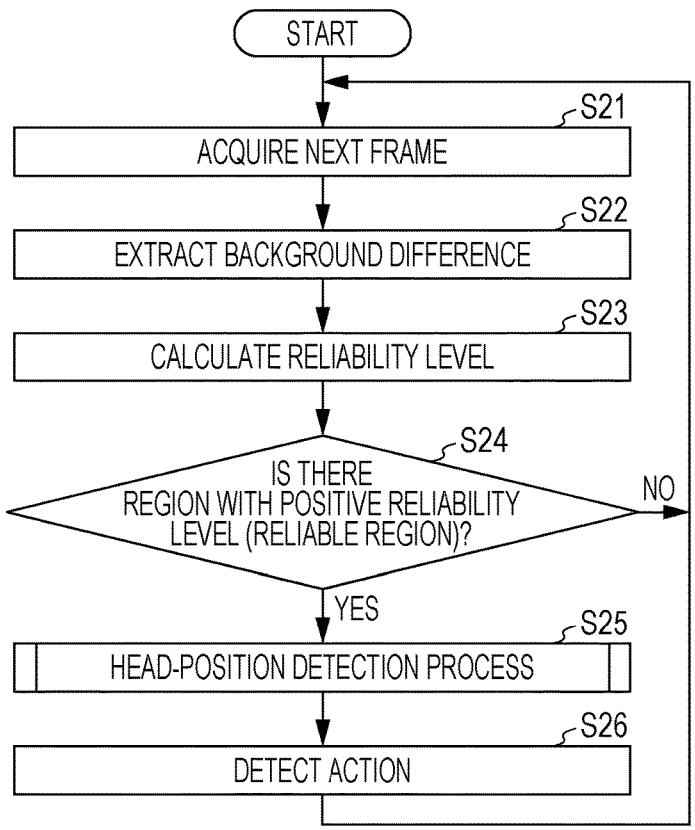
FIG. 13A is a flowchart illustrating an example of the procedure of a search process according to the first embodiment.

FIG. 13A is a flowchart illustrating an example of the procedure of a search process according to the first embodiment. The search process according to the first embodiment is executed every time the camera 30 acquires a new frame of an image. Alternatively, the search process according to the first embodiment may also be executed every time the setting apparatus 10 calculates a getting-up line L1, bed leaving lines L21 and L22, or a posture determination line L3, or every time the data stored in the head-and-non-head image-data storage unit 20 is updated. Alternatively, the search process according to the first embodiment may also be executed at certain intervals or at any timings.

First, the head search unit 110 acquires the next frame from the camera 30 (step S21). Next, the background subtraction processing unit 110b extracts a background difference from the frame acquired in step S21 (step S22). Next, the reliability level calculation unit 110c executes raster scanning on the frame from which the background difference has been extracted in step S22, and calculates a reliability level (step S23). Next, the reliability level calculation unit 110c determines whether or not there is a region with a positive reliability level (reliable region) in the frame on which raster scanning has been executed in step S23 (step S24). In the case where the reliability level calculation unit 110c determines that there is a region with a positive reliability level (reliable region) in the frame on which raster scanning has been executed in step S23 (Yes in step S24), the process proceeds to step S25. In contrast, in the case where the reliability level calculation unit 110c determines that there is no region with a positive reliability level (reliable region) in the frame on which raster scanning has been executed in step S23 (No in step S24), the process returns to step S21.

In step S25, the posture determination unit 110d and the head-position detection unit 110e execute a head-position detection process. The details of the head-position detection process according to the first embodiment will be described later with reference to FIG. 13B. Next, the tracking unit 120 detects an action of the user or the patient h of the bed b, based on the head position detected in step S25 (step S26). When the detection apparatus 100 completes step S26, the process returns to step S21.

Head-Position Detection Process According to First Embodiment

Figure 13B:
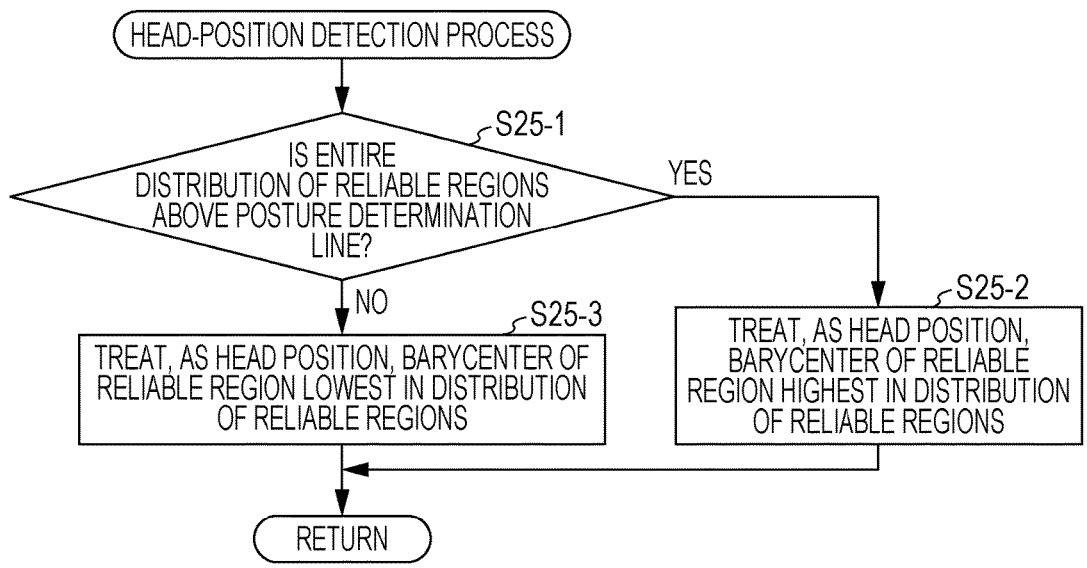
FIG. 13B is a flowchart illustrating an example of the procedure of a head-position detection process in the search process according to the first embodiment.

FIG. 13B is a flowchart illustrating an example of the procedure of the head-position detection process in the search process according to the first embodiment. The posture determination unit 110d determines whether or not, in the frame f, the entire distribution of regions with positive reliability levels (reliable regions) calculated in step S23 is positioned above the posture determination line L3 (step S25-1). In the case where the posture determination unit 110d determines that all the calculated reliable regions are positioned above the posture determination line L3 (Yes in step S25-1), the barycenter of the reliable region positioned highest in the distribution of the reliable regions in the frame f is treated as the head position (step S25-2). In contrast, in the case where the posture determination unit 110d determines that not all the reliable regions are positioned above the posture determination line L3 (No in step S25-1), the barycenter of the reliable region positioned lowest in the distribution of the reliable regions in the frame f is treated as the head position (step S25-3). When the posture determination unit 110d completes step S25-2 or step S25-3, the process proceeds to step S26 of FIG. 13A.

According to the first embodiment described above, the posture of the user or the patient h of the bed b is determined based on a positional relationship between the distribution of the reliable regions and the posture determination line L3, and the most likely head position is detected from among a plurality of head position candidates, based on the determined posture. Thus, the head-position detection accuracy may be improved.

Second Embodiment

In the first embodiment, the action detection unit 120f of the tracking unit 120 detects an action of the user or the patient h of the bed b, based on a head-position detection result obtained by the head-position detection unit 110e of the head search unit 110. However, the way in which an action of the user or the patient h of the bed b is detected is not limited to this. The tracking unit 120 may further detect the head position, based on the posture of the user or the patient h of the bed b, and detect an action of the user or the patient h of the bed b, based on this detection result. In a second embodiment, an example will be described in which a tracking unit further detects the head position, based on the posture of the user or the patient h of the bed b, and detects an action of the user or the patient h of the bed b, based on this detected result.

Detection System According to Second Embodiment

Figure 14:
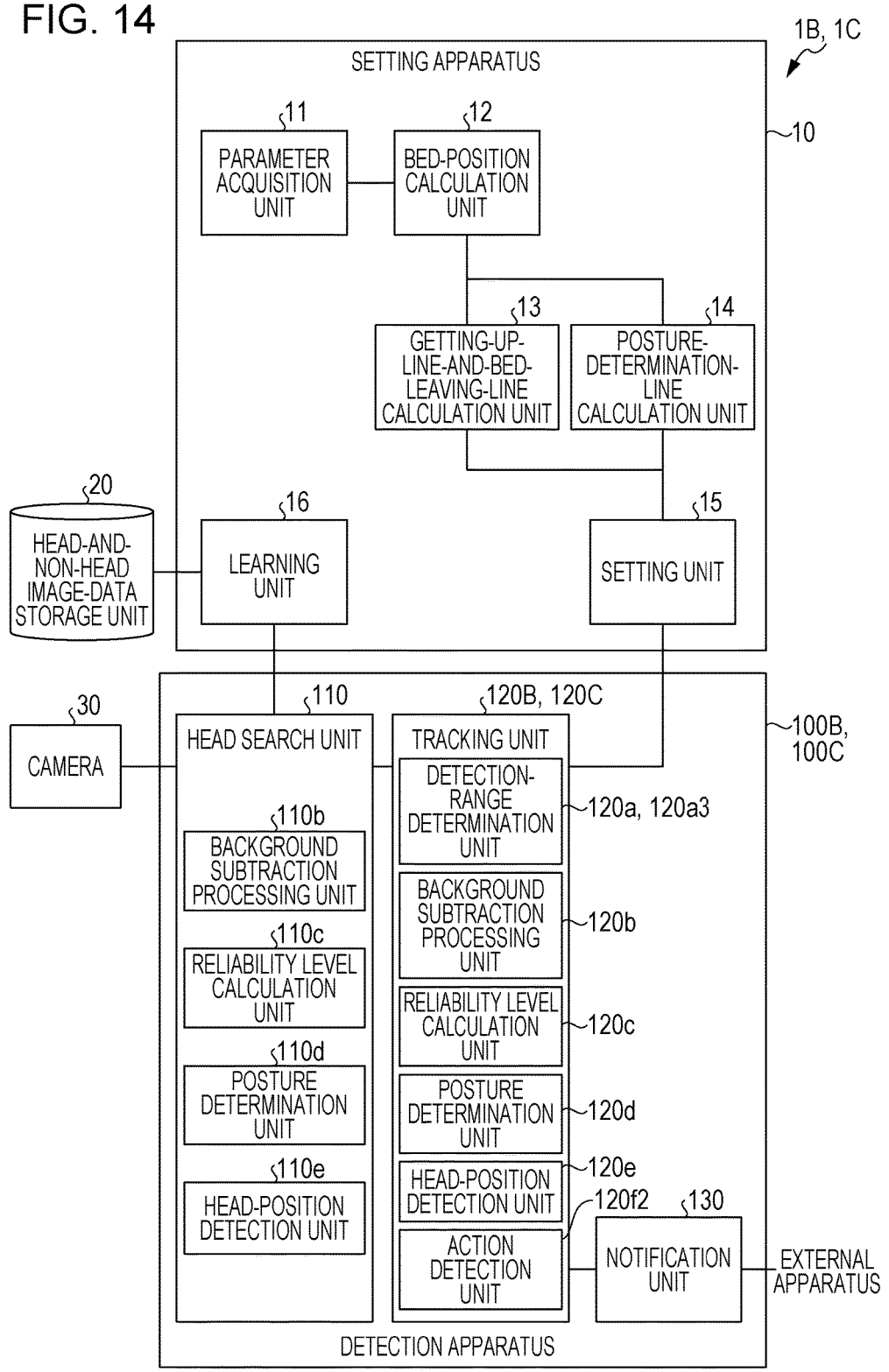
FIG. 14 is a block diagram illustrating an example of functional configurations of apparatuses included in a detection system according to a second embodiment (and a third embodiment)

FIG. 14 is a block diagram illustrating an example of functional configurations of apparatuses included in a detection system according to a second embodiment (and a third embodiment). A detection system 1B according to the second embodiment includes a detection apparatus 100B instead of the detection apparatus 100 of the detection system 1 according to the first embodiment.

Detection Apparatus According to Second Embodiment

As illustrated in FIG. 14, the detection apparatus 100B according to the second embodiment includes a head search unit 110, a tracking unit 120B, and a notification unit 130. The tracking unit 120B includes a detection-range determination unit 120a, a background subtraction processing unit 120b, a reliability level calculation unit 120c, a posture determination unit 120d, a head-position detection unit 120e, and an action detection unit 120f2.

The detection-range determination unit 120a determines a certain range to be a detection range for detecting a head image or candidates for the head image in the current frame, where the certain range includes a head image detected as the head position by the head-position detection unit 110e or candidate regions for the head image. Here, the detection range is a range including a region where the head image may move from the immediately preceding frame to the current frame.

Similarly to the background subtraction processing unit 110b, the background subtraction processing unit 120b detects, regarding the immediately preceding frame processed by the head search unit 110 and the next frame, a difference region d from the pixel differences between a background image and the immediately preceding frame, the pixel differences between the background image and the next frame, or the pixel differences between the immediately preceding frame and the next frame.

Similarly to the reliability level calculation unit 110c, the reliability level calculation unit 120c calculates, in the detection range set by the detection-range determination unit 120a, the reliability level of the frame for which the difference region d is detected by the background subtraction processing unit 120b. The reliability level calculation unit 120c extracts a region with a positive reliability level as the head image of the user or the patient h of the bed b or a candidate for the head image of the user or the patient h of the bed b, and extracts no region with a reliability level that is not positive.

When all candidate regions for the head image h1 of the user or the patient h of the bed b extracted as regions with positive reliability levels are positioned above a posture determination line L3, similarly to the posture determination unit 110d, the posture determination unit 120d determines that the posture of the user or the patient h of the bed b is in the getting-up state. The head-position detection unit 120e then detects, as the head position, the barycenter of the candidate region positioned highest among all the candidate regions for the head image h1 of the user or the patient h, who is determined to be in the getting-up state by the posture determination unit 120d, of the bed b.

In addition, in cases other than the case where all candidate regions for the head image h1 of the user or the patient h of the bed b extracted as regions with positive reliability levels are positioned above the posture determination line L3, similarly to the posture determination unit 110d, the posture determination unit 120d determines that the posture of the user or the patient h of the bed b is in the lying-in-bed state. The head-position detection unit 120e then detects, as the head position, the barycenter of the candidate region positioned lowest among all the candidate regions for the head image h1 of the user or the patient h, who is determined to be in the lying-in-bed state by the posture determination unit 120d, of the bed b.

Note that in the case where the posture determination unit 120d may not extract any candidate region with a positive reliability level for the head image h1 of the user or the patient h of the bed b at all, the process proceeds so that the head search unit 110 is caused to perform processing on the next frame.

The action detection unit 120f2 determines whether or not the barycenter of the head position detected by the head-position detection unit 120e has crossed a getting-up line or any of bed leaving lines. In the case where the barycenter of the head position has crossed the getting-up line, the action detection unit 120f2 determines that the user or the patient h of the bed b is in the getting-up state. In the case where the barycenter of the head position has crossed any of the bed leaving lines, the action detection unit 120f2 determines that the user or the patient h of the bed b is in the bed leaving state. When action detection unit 120f2 determines that the user or the patient h of the bed b is in, for example, the bed leaving state, the action detection unit 120f2 commands the notification unit 130 to issue a notification such as a nurse call.

In contrast, when the action detection unit 120f2 does not determine that the user or the patient h of the bed b is in the getting-up state or the bed leaving state, the action detection unit 120f2 causes the reliability level calculation unit 120c, the posture determination unit 120d, and the head-position detection unit 120e to perform the processes on the set detection range of the next frame.

Search Process According to Second Embodiment

Figure 15:
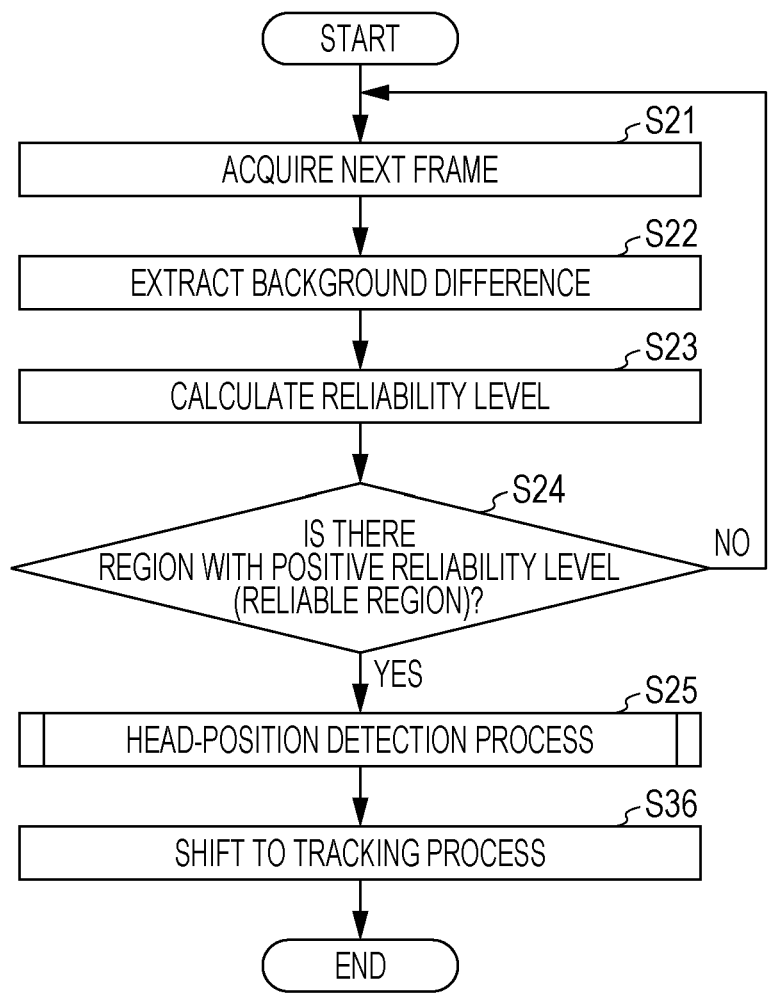
FIG. 15 is a flowchart illustrating an example of the procedure of a search process according to the second embodiment.

FIG. 15 is a flowchart illustrating an example of the procedure of a search process according to the second embodiment. The search process according to the second embodiment is executed every time the camera 30 acquires a new frame of an image. Alternatively, the search process according to the second embodiment may also be executed every time the setting apparatus 10 calculates a getting-up line L1, bed leaving lines L21 and L22, or a posture determination line L3, or every time the data stored in the head-and-non-head image-data storage unit 20 is updated. Alternatively, the search process according to the second embodiment may also be executed at certain intervals or at any timings.

Steps S21 to S25 of the search process illustrated in FIG. 15 and according to the second embodiment are substantially the same as those of the first embodiment. When the head search unit 110 completes step S25, the process shifts to a tracking process performed by the tracking unit 120B (step S36).

Tracking Process According to Second Embodiment

Figure 16A:
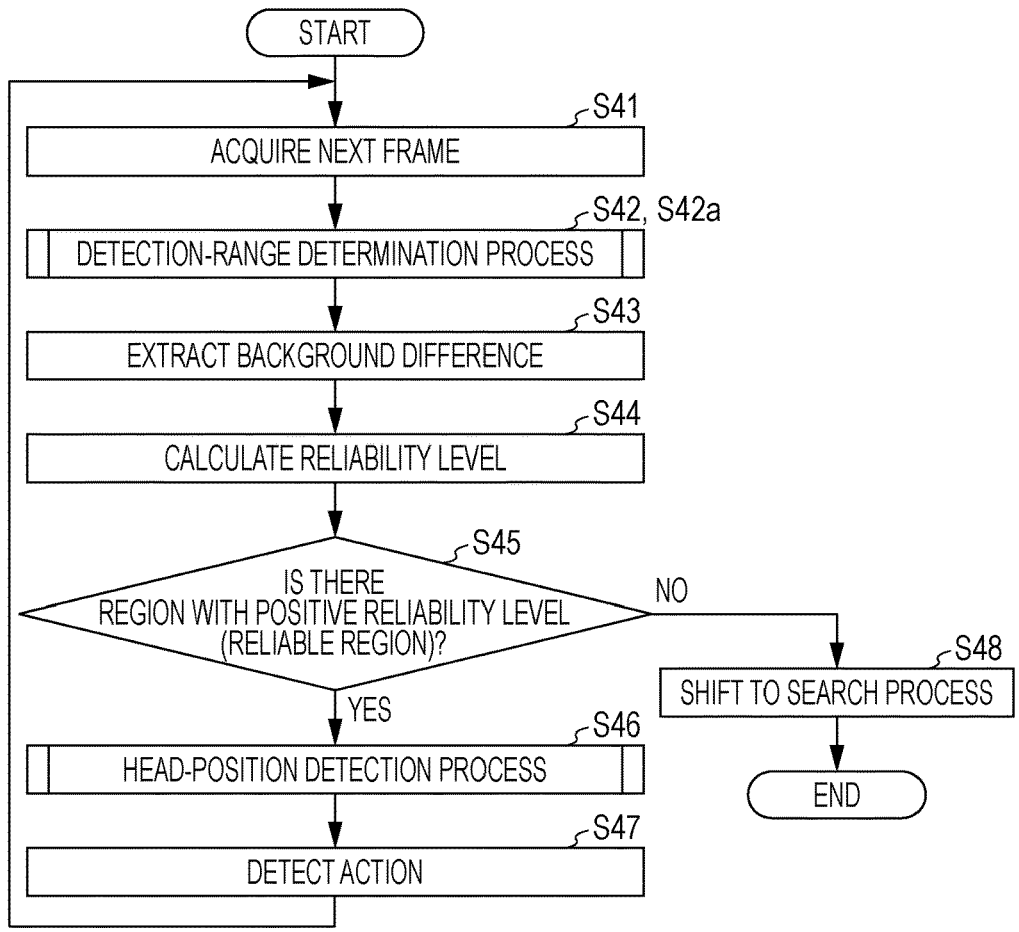
FIG. 16A is a flowchart illustrating an example of the procedure of a tracking process according to the second embodiment (and the third embodiment)

FIG. 16A is a flowchart illustrating an example of the procedure of a tracking process according to the second embodiment (and the third embodiment). The tracking process according to the second embodiment is started up every time step S36 of the search process according to the second embodiment is executed.

First, the tracking unit 120B of the detection apparatus 100B acquires the next frame of the immediately preceding frame acquired in step S21 of FIG. 15 (step S41). Next, the detection-range determination unit 120a sets, as a detection range, a certain range including candidate regions for the head detected as the head position by the head-position detection unit 110e (step S42). Next, the background subtraction processing unit 120b extracts a background difference about the detection range determined in step S42 (step S43).

Next, the reliability level calculation unit 120c calculates, about the frame from which the background difference has been extracted in step S43, the reliability level of the detection range determined in step S42 (step S44). Next, the reliability level calculation unit 120c determines whether or not there is a region with a positive reliability level (reliable region) in the frame on which raster scanning has been executed in step S44 (step S45). In the case where the reliability level calculation unit 120c determines that there is a region with a positive reliability level (reliable region) in the frame on which raster scanning has been executed in step S44 (Yes in step S45), the process proceeds to step S46. In contrast, in the case where the reliability level calculation unit 120c determines that there is no region with a positive reliability level (reliable region) in the frame on which raster scanning has been executed in step S44 (No in step S45), the process proceeds to step S48.

In step S46, the posture determination unit 120d and the head-position detection unit 120e execute a head-position detection process. The details of the head-position detection process according to the second embodiment will be described later with reference to FIG. 16B. Next, the tracking unit 120B detects an action of the user or the patient h of the bed b, based on the head position detected in step S46 (step S47). When the detection apparatus 100B completes step S47, the process returns to step S41.

In contrast, in step S48, the tracking unit 120B causes the process to shift to the search process illustrated in FIG. 15. When the detection apparatus 100B completes step S48, the tracking process according to the second embodiment ends.

Head-Position Detection Process According to Second Embodiment

Figure 16B:
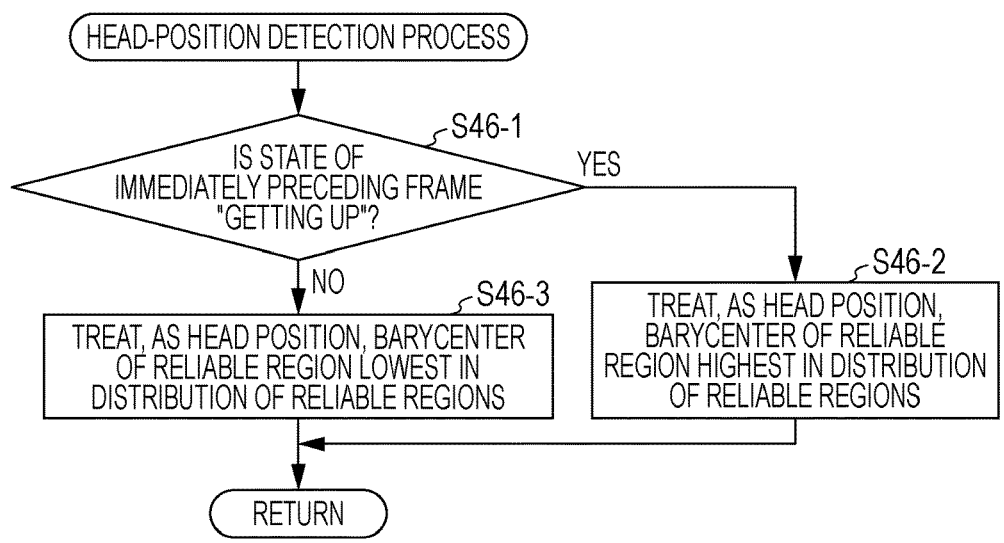
FIG. 16B is a flowchart illustrating an example of the procedure of a head-position detection process in the tracking process according to the second embodiment.

FIG. 16B is a flowchart illustrating an example of the procedure of the head-position detection process in the tracking process according to the second embodiment. The posture determination unit 120d determines whether or not the state of the immediately preceding frame is "getting up" (step S46-1). That is, the posture determination unit 120d determines, in step S25 of FIG. 15, whether or not the entire distribution of regions with positive reliability levels (reliable regions) is positioned above the posture determination line L3 in the frame immediately preceding the frame acquired in step S41. In the case where the posture determination unit 120d determines that the state of the immediately preceding frame is "getting up" (Yes in step S46-1), the barycenter of the reliable region positioned highest in the distribution of the reliable regions in the detection range of the frame acquired in step S41 is treated as the head position (step S46-2). In contrast, in the case where the posture determination unit 120d determines that the state of the immediately preceding frame is "lying in bed" (No in step S46-1), the barycenter of the reliable region positioned lowest in the distribution of the reliable regions in the detection range of the frame acquired in step S41 is treated as the head position (step S46-3). When the posture determination unit 120d completes step S46-2 or step S46-3, the process proceeds to step S47 of FIG. 16A.

Figure 17:
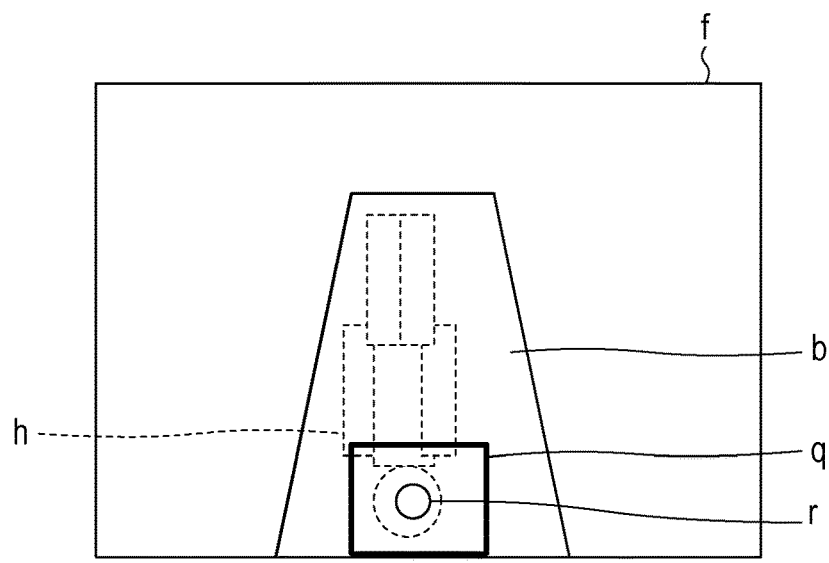
FIG. 17 is a diagram schematically illustrating an example of an overview of a detection-range determination process in the tracking process according to the second embodiment.

FIG. 17 is a diagram schematically illustrating an example of an overview of a detection-range determination process in the tracking process according to the second embodiment. For example, as illustrated in FIG. 17, in the case where the posture of the user or the patient h of the bed b is determined to be "lying in bed" in the search process performed on the immediately preceding frame, the head image of the user or the patient h is detected and tracked during the tracking process in a detection range q including the barycenter r of a candidate region positioned at the detected head position of the user or the patient h. Thus, according to the second embodiment described above, even when the process shifts from the search process to the tracking process, the head position in the current frame is detected in the tracking process in accordance with the posture of the user or the patient h of the bed b and the detection range q determined in the search process. Consequently, according to the second embodiment, the head of the user or the patient h of the bed b may be efficiently tracked with high accuracy.

Third Embodiment

In the second embodiment, the head position in the current frame is detected in the tracking process in accordance with the posture of the user or the patient h of the bed b and the detection range determined in the search process. However, the detection range q including the barycenter r of the candidate region positioned at the head position of the user or the patient h of the bed b detected in the search process does not capture the head h1 of the user or the patient h on every occasion. Thus, in the third embodiment, the detection range q including the barycenter r of the candidate region positioned at the head position of the user or the patient h of the bed b detected in the search process is expanded appropriately, and the head image h1 of the user or the patient h is tried to be captured during the tracking process.

Figure 18A:
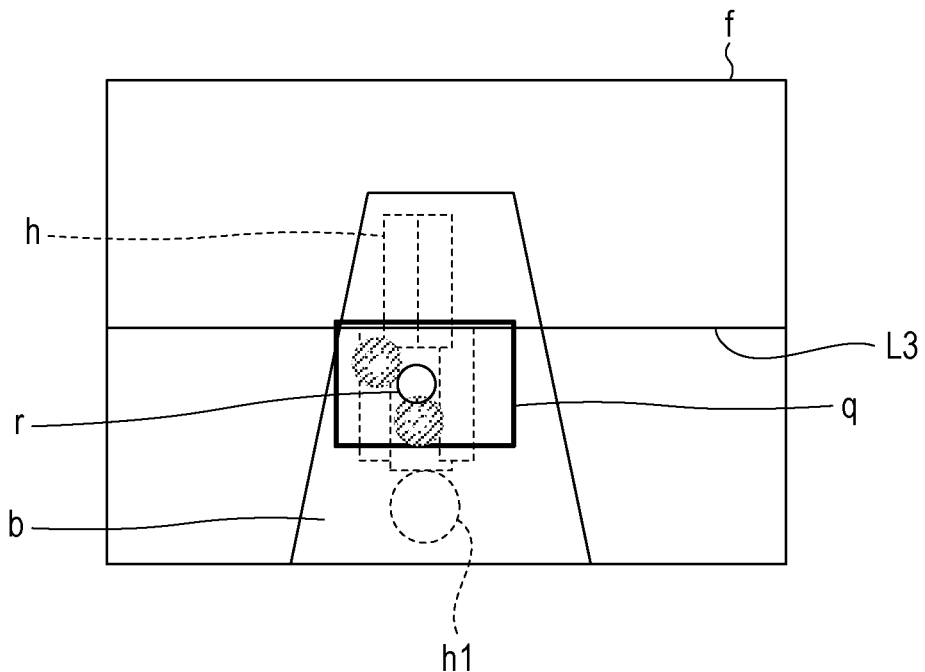
FIGS. 18A and 18B are diagrams schematically illustrating an example of an overview of a detection-range determination process in the tracking process according to the third embodiment.
Figure 18B:
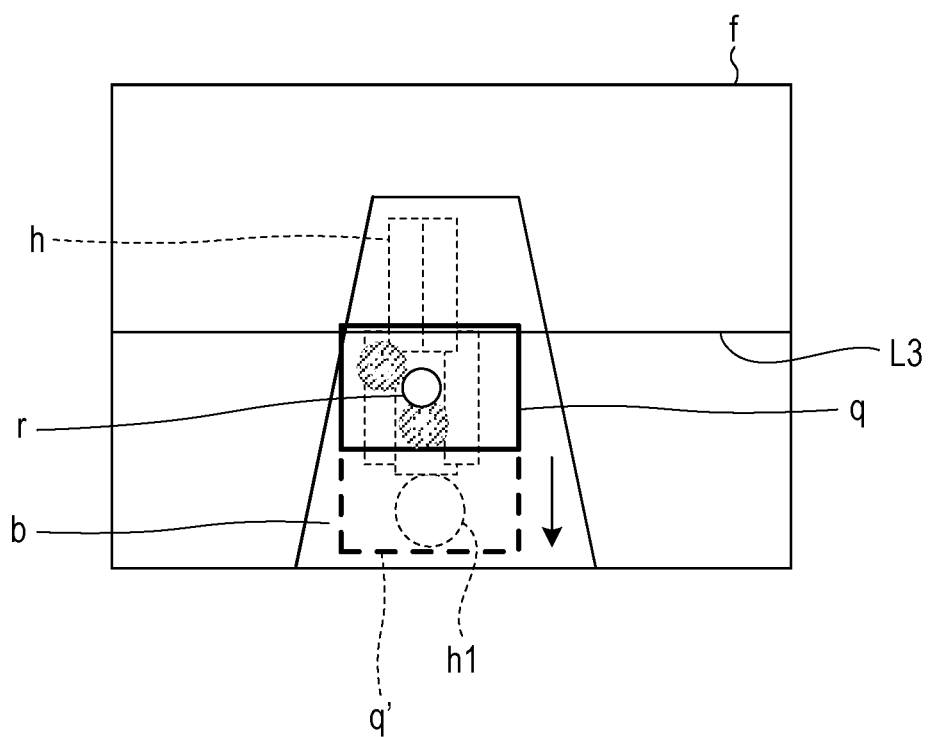

FIGS. 18A and 18B are diagrams schematically illustrating an example of an overview of a detection-range determination process in the tracking process according to the third embodiment. FIG. 18A illustrates a case where the posture of the user or the patient h of the bed b determined in the search process is "lying in bed", and a certain detection range q including the barycenter r of a candidate region positioned at the head position of the user or the patient h of the bed b detected in the search process does not capture the head image h1 of the user or the patient h. In such a case in the third embodiment, as illustrated in FIG. 18B, the certain detection range q is expanded toward the bottom of a frame f. This is based on the idea that, in the case where the posture of the user or the patient h of the bed b determined in the search process is "lying in bed", and the position of the head image h1 of the user or the patient h is not correctly captured, the head image h1 of the user or the patient h is likely to be in an expanded detection range q' obtained by expanding the detection range q toward the bottom of the frame f. When the tracking process for tracking the head image h1 of the user or the patient h is continued in the expanded detection range q', the head image h1 of the user or the patient h may be correctly captured.

Figure 18C:
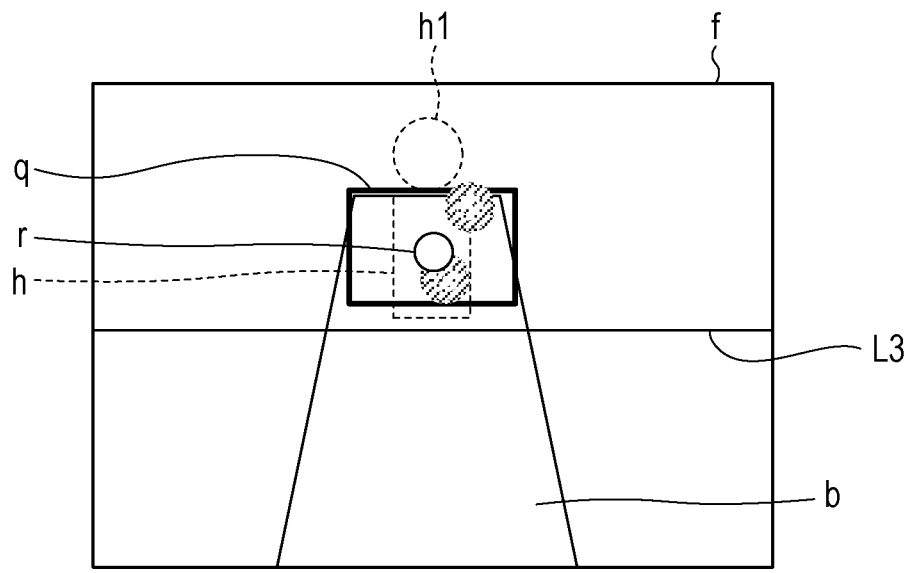
FIGS. 18C and 18D are diagrams schematically illustrating an example of the overview of the detection-range determination process in the tracking process according to the third embodiment.
Figure 18D:
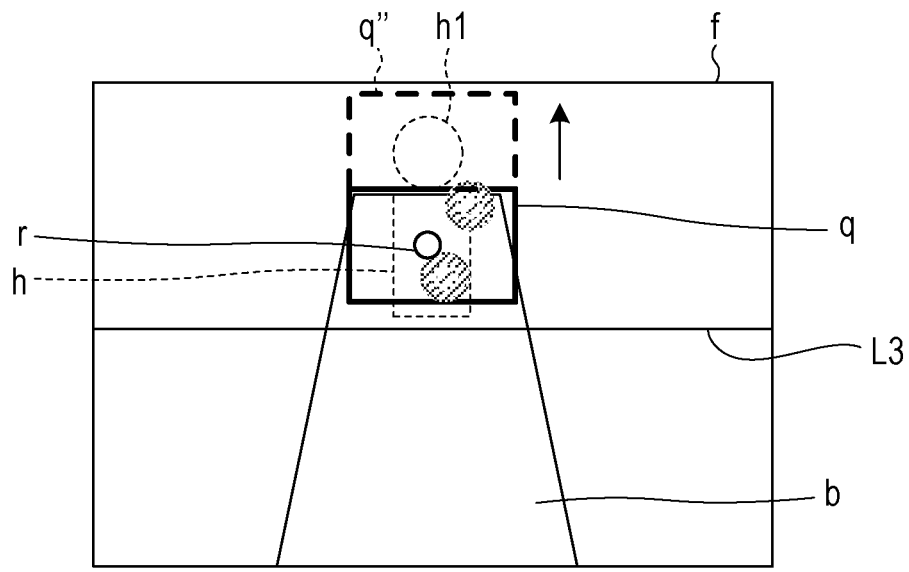

In addition, FIGS. 18C and 18D are diagrams schematically illustrating an example of the overview of the detection-range determination process in the tracking process according to the third embodiment. FIG. 18C illustrates a case where the posture of the user or the patient h of the bed b determined in the search process is "getting up", and a detection range q including the barycenter r of a candidate region positioned at the head position of the user or the patient h of the bed b detected in the search process does not capture the head image h1 of the user or the patient h. In such a case in the third embodiment, as illustrated in FIG. 18D, the detection range q is expanded toward the top of the frame f. This is based on the idea that, in the case where the posture of the user or the patient h of the bed b determined in the search process is "getting up", and the position of the head image h1 of the user or the patient h is not correctly captured, the head image h1 of the user or the patient h is likely to be in an expanded detection range q" obtained by expanding the detection range q toward the top of the frame f. When the tracking process for tracking the head image h1 of the user or the patient h is continued in the expanded detection range q", the head image h1 of the user or the patient h may be correctly captured.

Detection-Range Determination Process According to Third Embodiment

Figure 19:
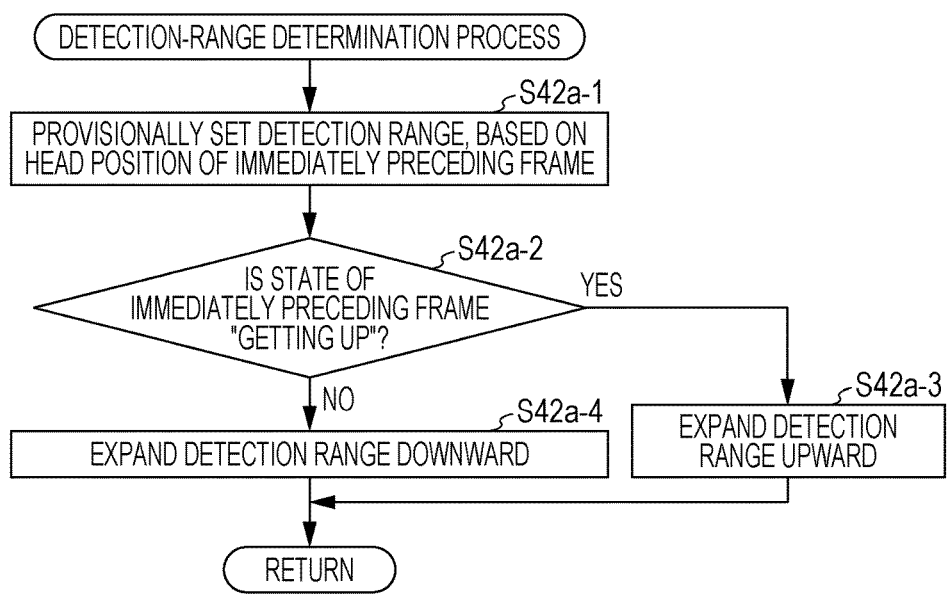
FIG. 19 is a flowchart illustrating an example of the procedure of the detection-range determination process in the tracking process according to the third embodiment.

FIG. 19 is a flowchart illustrating an example of the procedure of the detection-range determination process in the tracking process according to the third embodiment. The flowchart of FIG. 19 is executed as a subroutine of step S42a in the flowchart of FIG. 16A. A detection-range determination unit 120a3 of a detection apparatus 100C of a detection system 1C (see FIG. 14) provisionally sets a detection range, based on the head position of the immediately preceding frame (step S42a-1). The detection range provisionally set in step S42a-1 is, for example, the detection range q set in FIG. 18A and that set in FIG. 18C.

Next, the detection-range determination unit 120a3 determines whether or not the state of the immediately preceding frame is "getting up" (step S42a-2). In the case where the detection-range determination unit 120a3 determines that the state of the immediately preceding frame is "getting up" (Yes in step S42a-2), the process proceeds to step S42a-3. In contrast, in the case where the detection-range determination unit 120a3 determines that the state of the immediately preceding frame is "lying in bed" (No in step S42a-2), the process proceeds to step S42a-4.

In step S42a-3, the detection-range determination unit 120a3 expands the detection range upward. That is, the detection-range determination unit 120a3 expands the detection range from the certain detection range q to the expanded detection range q". In contrast, in step S42a-4, the detection-range determination unit 120a3 expands the detection range downward. That is, the detection-range determination unit 120a3 expands the detection range from the certain detection range q to the expanded detection range q'. When step S42a-3 or step S42a-4 is completed, the detection-range determination unit 120a3 causes the process to shift to step S43 of FIG. 16A.

According to the third embodiment described above, even when the position of the head image h1 of the user or the patient h of the bed b is incorrectly captured in the search process, the probability that the position of the head image h1 of the user or the patient h is correctly captured in the tracking process is increased, and the accuracy of detection of an action of the user or the patient h may be increased.

[Distribution and Integration]

The structural elements of the apparatuses illustrated in the above-described embodiments do not have to be configured physically as in the drawings. That is, specific and distributed or integrated embodiments of the apparatuses are not limited to those illustrated in the drawings, and all or part of the structural elements may be functionally or physically configured in a distributed manner or an integrated manner in any units in accordance with various types of load, use state, and the like.

For example, the head search unit 110 according to the first embodiment illustrated in FIG. 1 may be configured as a head detection apparatus that detects a head position. In addition, for example, a head detection apparatus may also be configured including the head search unit 110, and the detection-range determination unit 120a, the background subtraction processing unit 120b, the reliability level calculation unit 120c, the posture determination unit 120d, and the head-position detection unit 120e of the tracking unit 120B according to the second embodiment and illustrated in FIG. 14. In addition, for example, a head detection apparatus may also be configured including the head search unit 110, and the detection-range determination unit 120a3, the background subtraction processing unit 120b, the reliability level calculation unit 120c, the posture determination unit 120d, and the head-position detection unit 120e of the tracking unit 120C according to the third embodiment and illustrated in FIG. 14.

In addition, for example, the setting apparatus 10 and each of the detection apparatuses 100, 100B, and 100C may be integrated. In addition, some of or all the bed-position calculation unit 12, the getting-up-line-and-bed-leaving-line calculation unit 13, and the posture-determination-line calculation unit 14 may be integrated as appropriate in the setting apparatus 10. In addition, the background subtraction processing unit 110b of the head search unit 110 and the background subtraction processing unit 120b of the tracking units 120B and 120C may be integrated. In addition, the reliability level calculation unit 110c of the head search unit 110 and the reliability level calculation unit 120c of the tracking units 120B and 120C may be integrated. In addition, the posture determination unit 110d of the head search unit 110 and the posture determination unit 120d of the tracking units 120B and 120C may be integrated. In addition, the head-position detection unit 110e of the head search unit 110 and the head-position detection unit 120e of the tracking units 120B and 120C may be integrated.

In addition, the setting apparatus 10 and the detection apparatus 100, 100B, and 100C are provided at a data center as appropriate, and may be configured as a server apparatus or the like that provides a service, for example, a cloud service via a network.

[Program]

The various types of process described in the embodiments above may be realized by a computer such as a personal computer or a workstation executing a program prepared in advance. In the following, an example of a computer that executes a program having substantially the same functions as the embodiments above will be described using FIG. 20.

Figure 20:
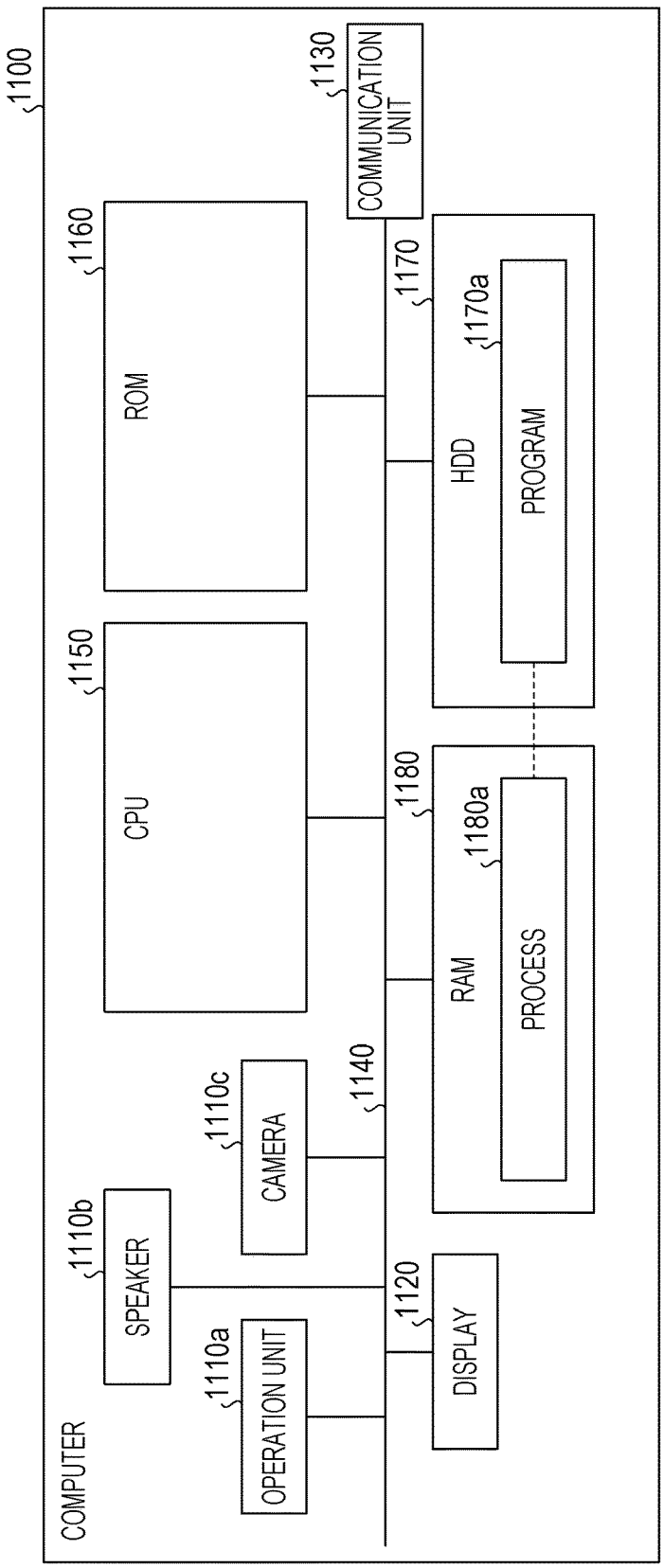
FIG. 20 is a diagram illustrating an example of a hardware configuration of a computer that executes a program according to the first to third embodiments.

FIG. 20 is a diagram illustrating an example of a hardware configuration of a processor or a computer that executes a program according to the first to third embodiments. As illustrated in FIG. 20, a processor or a computer 1100 includes an operation unit 1110a, a speaker 1110b, a camera 1110c, a display 1120, and a communication unit 1130. Furthermore, the computer 1100 includes a CPU 1150, a ROM 1160, a HDD 1170, and a RAM 1180. These units 1110 to 1180 are connected to each other via a bus 1140.

In the case where the computer 1100 is caused to function as the setting apparatus 10 described in the first to third embodiments, a program 1170a is a program that delivers substantially the same functions as the units of the setting apparatus 10 by being executed by a CPU or the like. The program 1170a that delivers substantially the same functions as the units of the setting apparatus 10 is modularized as appropriate, similarly to distribution or integration of the units of the setting apparatus 10.

Alternatively, in the case where the computer 1100 is caused to function as the detection apparatuses 100 to 100C described in the first to third embodiments, the program 1170a is a program that delivers substantially the same functions as the units of the detection apparatuses 100 to 100C by being executed by a CPU or the like. The program 1170a that delivers substantially the same functions as the units of the detection apparatuses 100 to 100C is modularized as appropriate, similarly to distribution or integration of the units of the detection apparatuses 100 to 100C.

In addition, all pieces of data stored in the HDD 1170 do not have to be stored in the HDD 1170 on every occasion, and only the data to be used in processing has only to be stored in the HDD 1170.

The CPU 1150 reads out the program 1170a from the HDD 1170, and loads the program 1170a into the RAM 1180. As a result of this, the program 1170a functions as a process 1180a as illustrated in FIG. 20. The process 1180a loads, as appropriate, various types of data read out from the HDD 1170 into an area allocated thereto on the RAM 1180, and executes various types of processing, based on these loaded various types of data.

Note that in the case where the computer 1100 is caused to function as the setting apparatus 10 described in the first to third embodiments, processing executed by the process 1180a includes processing executed by the units of the setting apparatus 10 described in the first to third embodiments. Alternatively, in the case where the computer 1100 is caused to function as the detection apparatuses 100, 1006, and 100C described in the first to third embodiments, processing executed by the process 1180a includes processing executed by the units of the detection apparatus 100, 100B, and 100C described in the first to third embodiments.

In addition, all the processing units realized on the CPU 1150 do not have to be operated on the CPU 1150 on every occasion and only the processing unit to be used in processing has only to be realized at the time of execution.

Note that the program 1170a does not have to be stored in the HDD 1170 or the ROM 1160 from the beginning on every occasion. For example, programs are stored in flexible disks to be inserted into the computer 1100, which are "portable physical media" such as a FD, a CD-ROM, a DVD disc, a magneto-optical disk, and an IC card. The computer 1100 may acquire, from these portable physical media, and execute the programs. In addition, the programs are stored in other computers, server apparatuses, or the like connected to the computer 1100 via public lines, the Internet, LANs, WANs, and the like, and the computer 1100 may acquire, from these computers or server apparatuses, and execute the programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable recording medium having therein a program for causing a computer to execute a process, the process comprising:
    acquiring an image captured by a camera;
    detecting one or more head candidates of a person from the image by at least one of a background subtraction method and head-shape edge detection processing;
    determining whether each of a plurality of positions of a plurality of head candidates in the image satisfies a condition when a plurality of head candidates of the person are detected from the image by the detecting;
    selecting, from the plurality of head candidates, a first head candidate whose position is highest in the plurality of head candidates in the image as a head of the person in the image when determining that all of the plurality of positions of a plurality of head candidates in the image satisfy the condition; and
    selecting, from the plurality of head candidates, a second head candidate whose position is lowest in the plurality of head candidates in the image as the head of the person in the image when determining that at least one of the plurality of positions of a plurality of head candidates in the image does not satisfy the condition.

2. The non-transitory computer readable recording medium according to claim 1, the process comprising:
    expanding a region for detecting the one or more head candidate; and
    selecting a third head candidate as the head of the person in the image when the third head candidate is detected in the expanded region.

3. The non-transitory computer readable recording medium according to claim 1, wherein
    the camera is installed in a direction from a position at a bed near a pillow toward a position of feet of the person lying on the bed.

4. The non-transitory computer readable recording medium according to claim 3, wherein
    the line is defined on the basis of at least one of a length of the bed, an installation position of the camera, a depression angle of the camera, a height of the person, and a length of a upper body of the person.

5. The non-transitory computer readable recording medium according to claim 1, wherein
    the condition is that each of plurality of positions of a plurality of head candidates is upper than a line defined in the image.

6. A detection method comprising:
    acquiring, by a computer, an image captured by a camera;
    detecting one or more head candidates of a person from the image by at least one of a background subtraction method and head-shape edge detection processing;
    determining whether each of a plurality of positions of a plurality of head candidates in the image satisfies a condition when the plurality of head candidates of the person are detected from the image by the detecting;
    selecting, from the plurality of head candidates, a first head candidate whose position is highest in the plurality of head candidates in the image as a head of the person in the image when determining that all of the plurality of positions of a plurality of head candidates in the image satisfy the condition; and
    selecting, from the plurality of head candidates, a second head candidate whose position is lowest in the plurality of head candidates in the image as the head of the person in the image when determining that at least one of the plurality of positions of a plurality of head candidates in the image does not satisfy the condition.

7. A detection apparatus comprising:
    a memory; and
    a processor coupled to the memory and the processor configured to,
        acquire an image captured by a camera;
        detect one or more head candidates of a person from the image by at least one of a background subtraction method and head-shape edge detection processing;
        determine whether each of a plurality of positions of a plurality of head candidates in the image satisfies a condition when the plurality of head candidates of the person are detected from the image by the detecting;
        select, from the plurality of head candidates, a first head candidate whose position is highest in the plurality of head candidates in the image as a head of the person in the image when determining that all of the plurality of positions of a plurality of head candidates in the image satisfy the condition; and
        select, from the plurality of head candidates, a second head candidate whose position is lowest in the plurality of head candidates in the image as the head of the person in the image when determining that at least one of the plurality of positions of a plurality of head candidates in the image does not satisfy the condition.

* * * * *